United States Patent [19]

Hamanishi

[11] Patent Number: 4,653,877
[45] Date of Patent: Mar. 31, 1987

[54] REAR-FOCUS CONVERSION DEVICE LENS FOR TELEPHOTO LENS

[75] Inventor: Yoshinari Hamanishi, Tokyo, Japan

[73] Assignee: Nippon Kogaku K. K., Tokyo, Japan

[21] Appl. No.: 633,405

[22] Filed: Jul. 23, 1984

[30] Foreign Application Priority Data

Jul. 27, 1983 [JP] Japan .................. 58-137378

[51] Int. Cl.$^4$ ............... G02B 9/36; G02B 9/60; G02B 13/02
[52] U.S. Cl. .................................... 350/465
[58] Field of Search ................ 350/465, 463, 464

[56] References Cited

U.S. PATENT DOCUMENTS 4,126,378 11/1978 Ogino .................... 350/463
4,206,971 6/1980 Hamanishi et al. .

FOREIGN PATENT DOCUMENTS 28133 3/1979 Japan .

Primary Examiner—John K. Corbin
Assistant Examiner—Rebecca D. Gass
Attorney, Agent, or Firm—Shapiro and Shapiro

[57] ABSTRACT

A rear-focus conversion lens device is interposed between an objective lens and a camera body so as to provide a focal length of a combined lens system with the objective lens greater than that of the objective lens. The conversion lens device has a movable lens system which is movable on an optical axis relative to the objective lens and the camera body. The conversion lens device can focus on an object falling within a range of infinity and a predetermined short distance by moving the movable lens system. The conversion lens device satisfies certain conditions.

20 Claims, 36 Drawing Figures

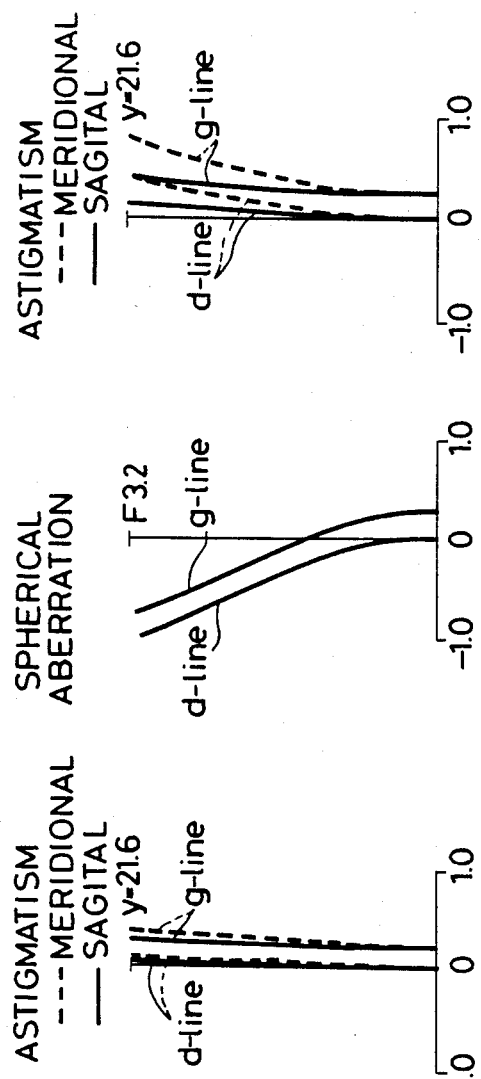
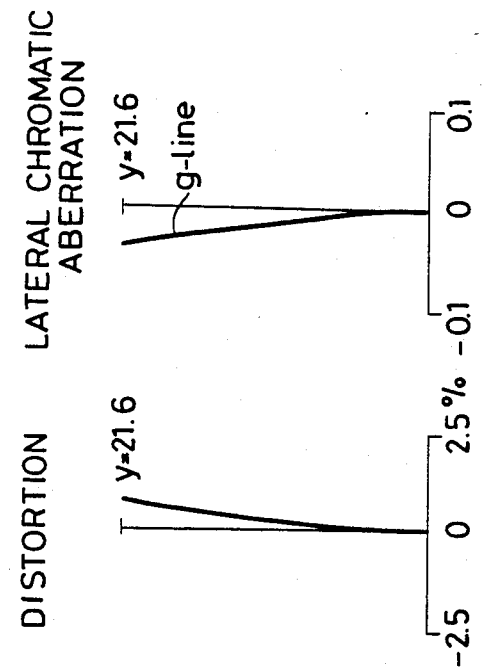
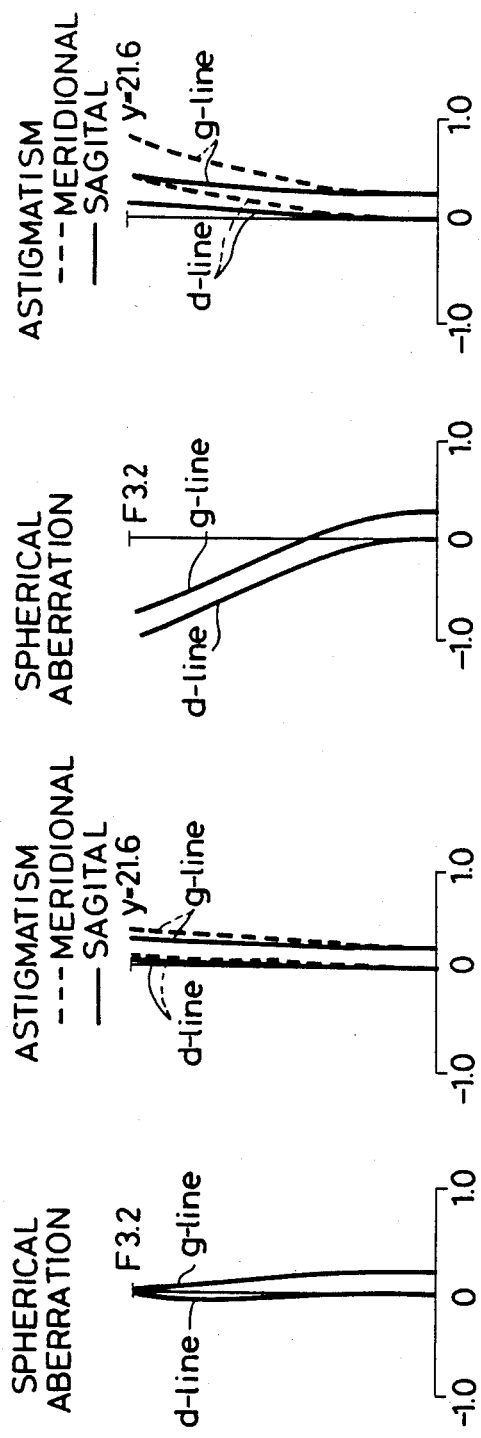
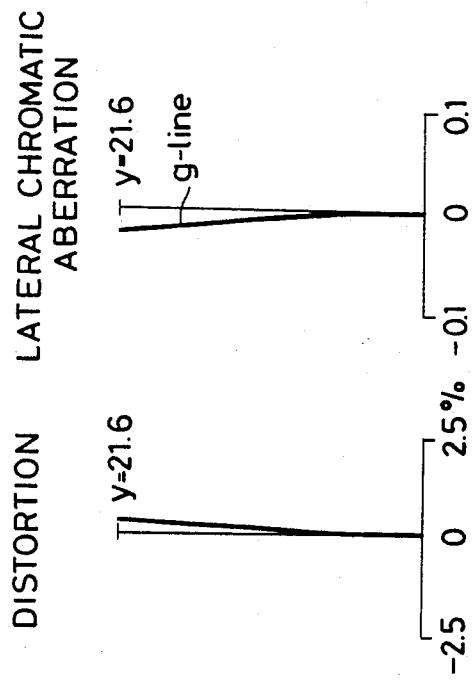
FIG. 7A
FIG. 7B

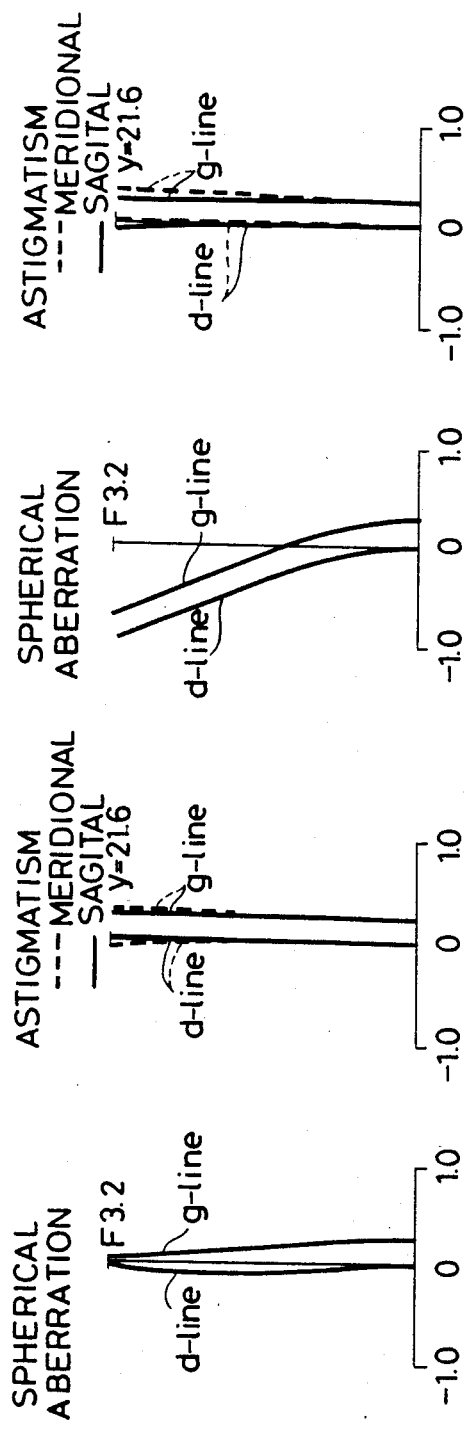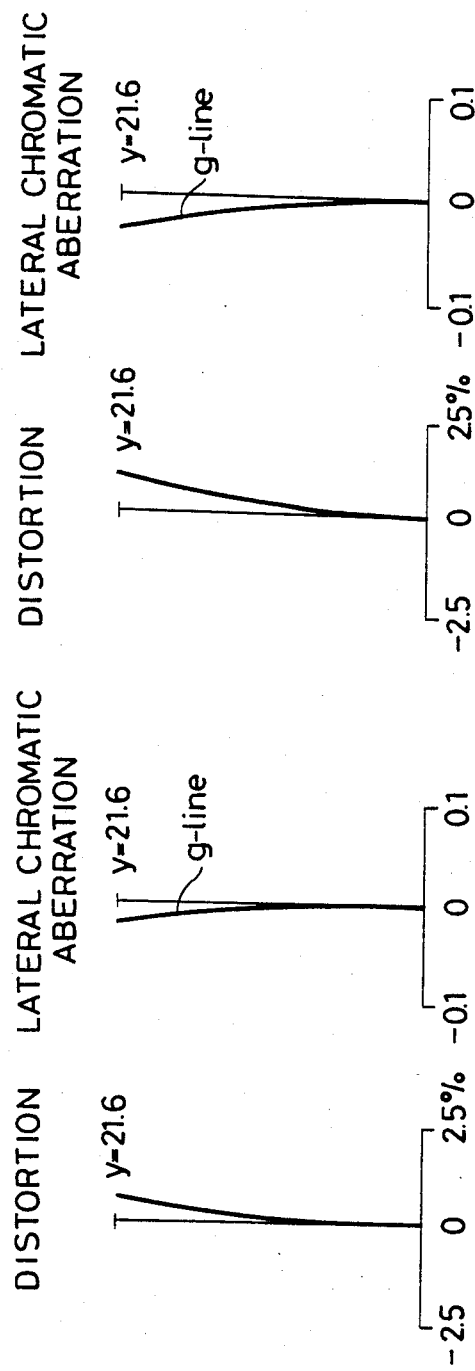

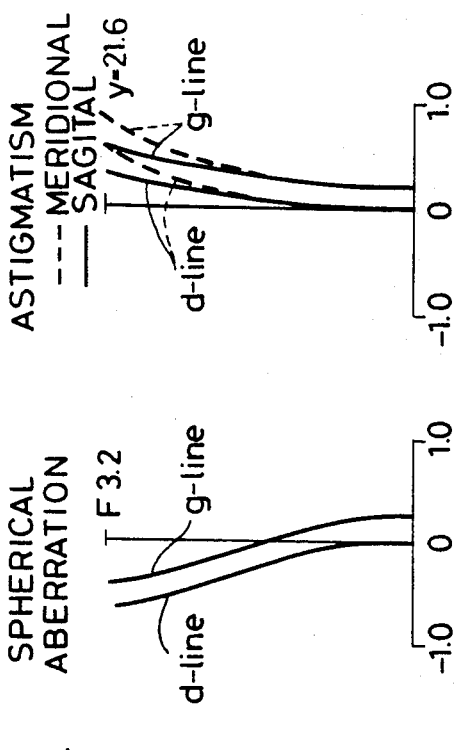
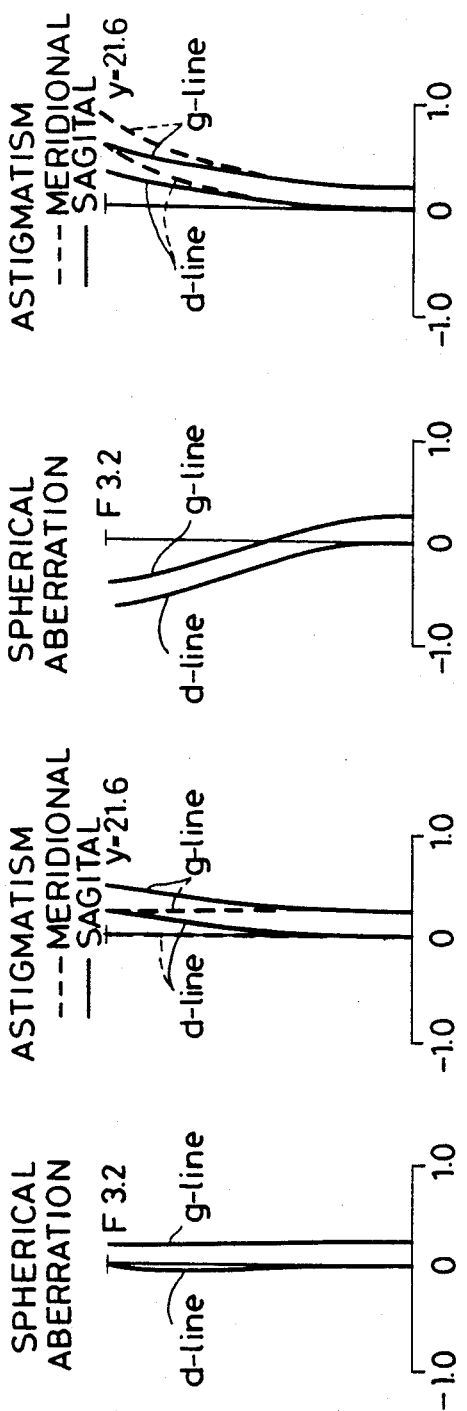
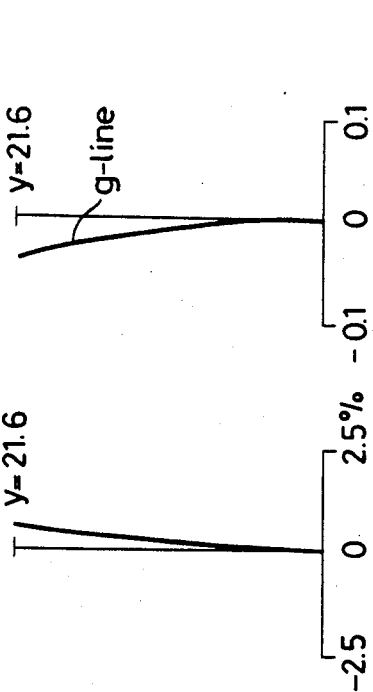
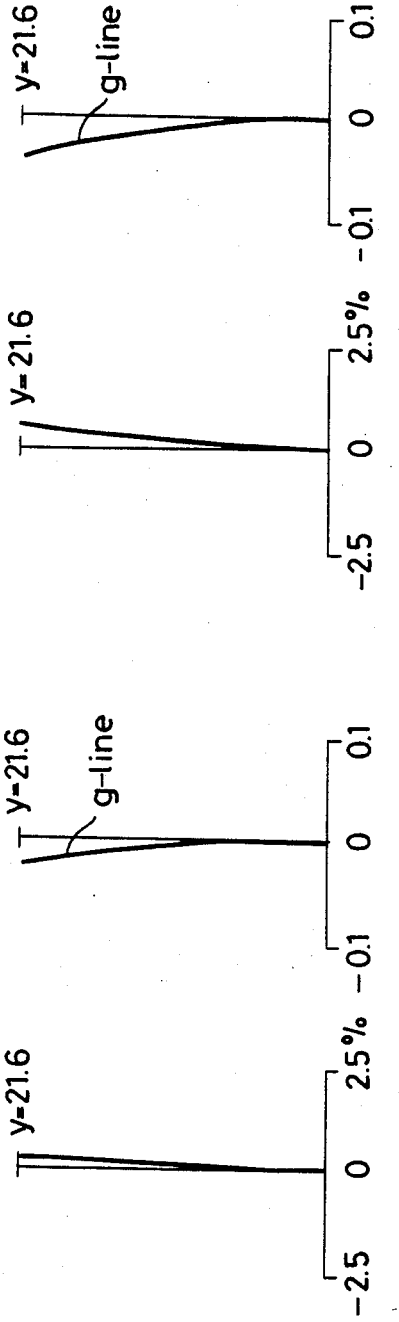
FIG.9A  FIG.9B

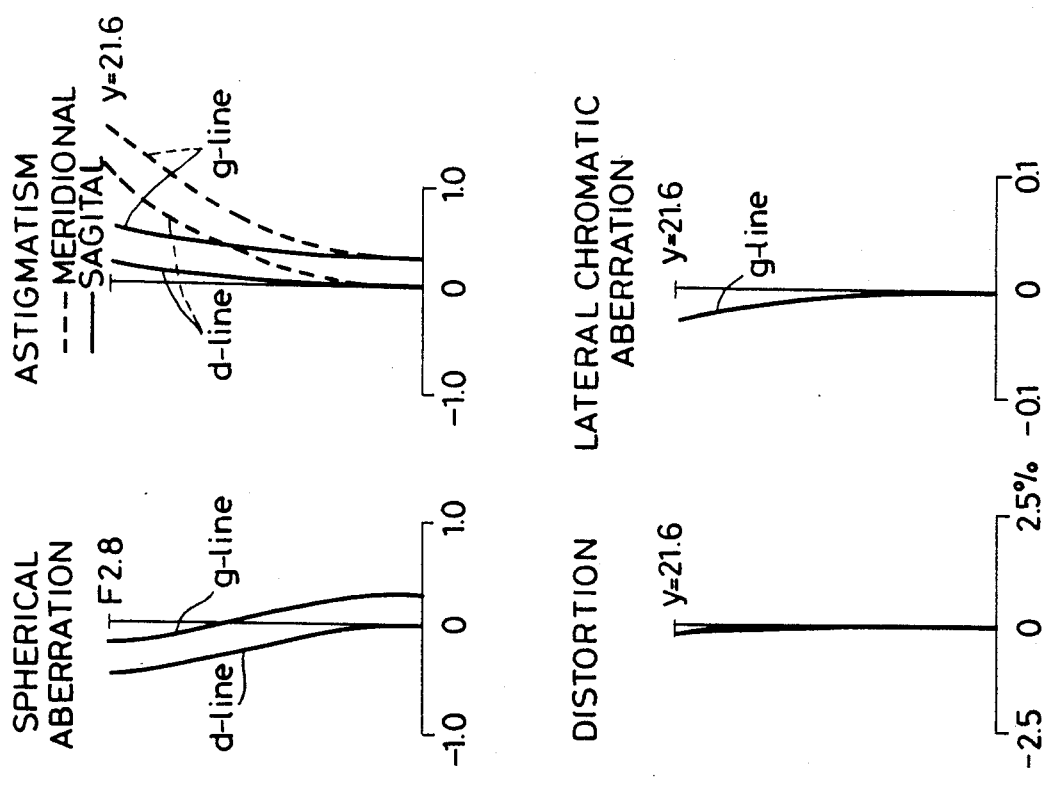
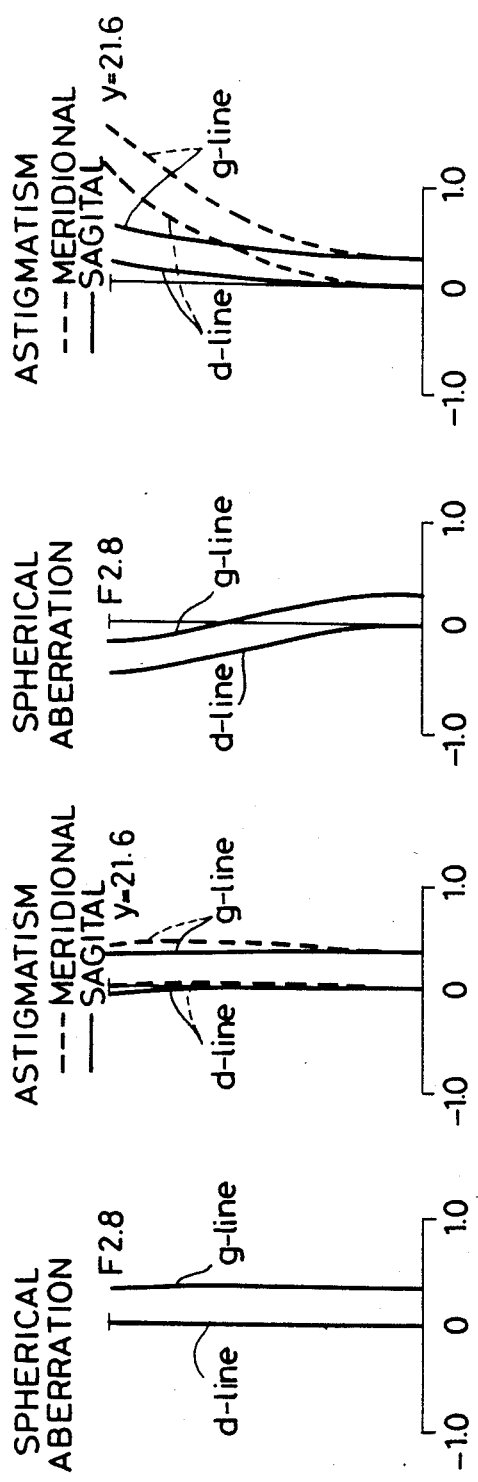
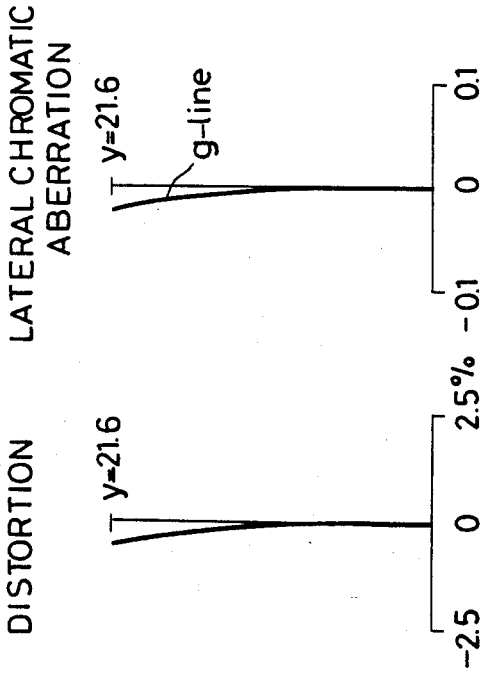

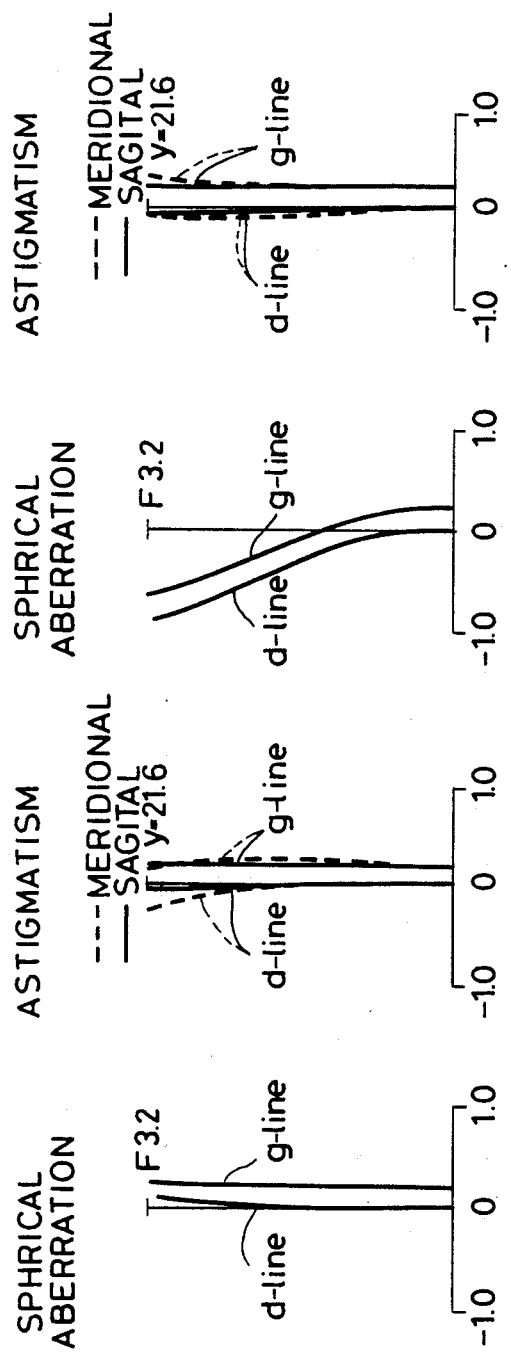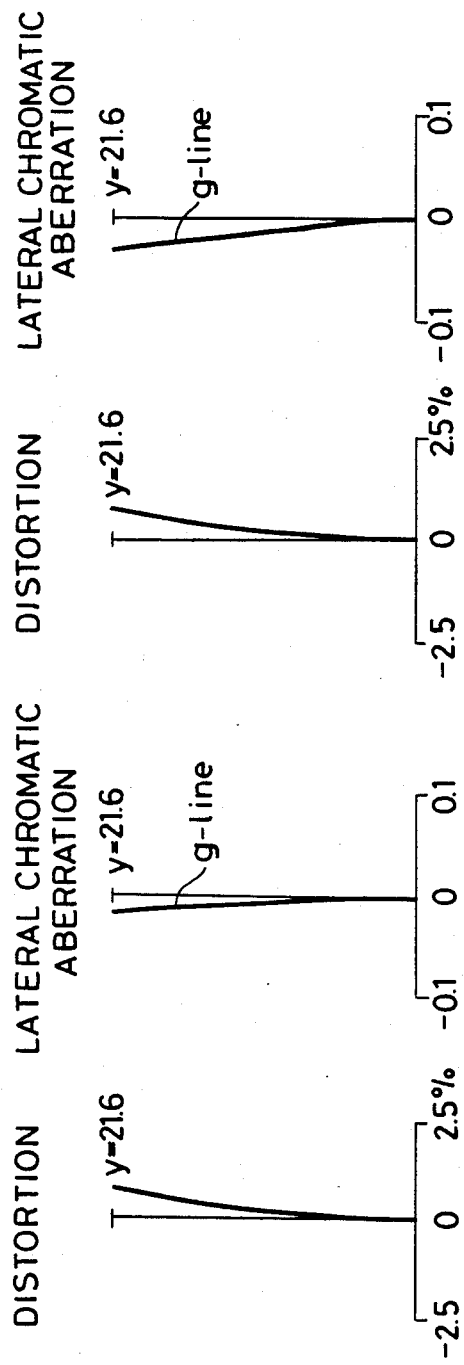

REAR-FOCUS CONVERSION DEVICE LENS FOR TELEPHOTO LENS

BACKGROUND OF THE INVENTION

1. Field of the Invention

The present invention relates to a focusing rear-focus conversion lens device which can be generally used for various telephoto lenses.

2. Description of the Prior Art

Various automatic focusing methods of photographic lenses are known. Various lenses for single lens reflex cameras which can be automatically focused are commercially on the market. However, such a lens allows automatic focusing of only a specific type of lens and is a special lens for automatic focusing. A lens of this type, therefore, cannot be used as a general-purpose automatic focusing lens and is moreover expensive. When a fast-moving object is photographed with a telephoto lens, since the depth of field of the telephoto lens is shallow, framing and focusing cannot be simultaneously performed in accordance with the fast movement of the object. In addition to this, since a telephoto lens is generally darker than a standard or normal lens, it has a lower focusing precision and a longer response time. For this reason, a simple automatic focusing apparatus which has a shorter response time is required especially for use in telephoto lenses.

SUMMARY OF THE INVENTION

It is an object of the present invention to provide a focusing rear conversion lens device or a rear-focus conversion lens, device which can be generally used for various types of telephoto lenses, has a simple structure, allows quick focusing, and maintains an excellent imaging performance.

Accordng to the present invention, there is provided a rear-focus conversion lens device which is interposed between an objective lens and a camera body do as to provide a synthetic optical sytem with the objective lens having a synthetic focal length greater than that of the objective lens, device wherein the conversion lens has a movable lens group or system which is movable on an optical axis relative to said objective lens and said camera body, and the conversion lens device can focus on an object falling within a range of infinity and a predetermined short distance by moving the movable lens group. The conversion lens device of the present invention satisfies the following relations:

$$1.2 < \beta < 2.5 \quad (1)$$

$$0.05 < |\Delta B_f / f_R| < 0.35 \quad (2)$$

$$0.4 < |B_f / d_o \beta| < 0.8 \quad (3)$$

where $\beta$ is the enlarging magnification of a focal length in an in-focus state at infinity, $\Delta B_f$ is the change in a synthetic back-focal distance $B_f$ when the synthetic optical system is focused within a range of infinity and a predetermined short distance, $f_R$ is the focal length of the rear-focus conversion lens, device and do is the distance between the vertex of a lens element surface of the rear-focus conversion lens device which is closest to the image and the image point of the objective lens.

BRIEF DESCRIPTION OF THE DRAWINGS

FIGS. 7A and 7B to 10A to 10B are graphs showing various aberrations according to the first to fourth embodiments of the present invention, in which FIGS. 7A through 10A correspond to an infinity in-focus state and FIGS. 7B through 10B correspond to a closest distance in-focus state;

FIGS. 15A and 15B to 17A and 17B are graphs showing various aberrations according to the fifth to seventh embodiments of the present invention, in which FIGS. 15A through 17A correspond to an infinity in-focus state and FIGS. 15B through 17B correspond to a closest distance in-focus state;

FIGS. 22A and 22B to 25A and 25B are graphs showing various aberrations according to the eighth to eleventh embodiments of the present invention, in which FIGS. 22A through 25A correspond to an infinity in-focus state and FIGS. 22B through 25B correspond to a closest distance in-focus state.

DETAILED DESCRIPTION OF THE PREFERRED EMBODIMENTS

The rear-focus conversion lens device according to the present invention will be referred to as a rear-focus conversion lens or simply as an RFC for brevity hereinafter and will be described in detail with reference to the accompanying drawings.

Figure 1:
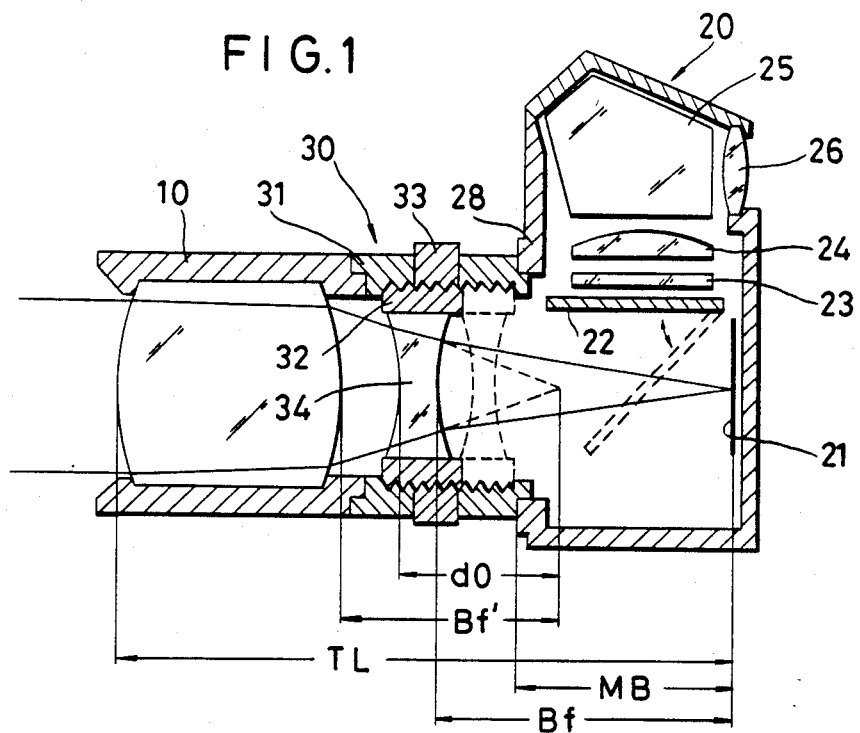
FIG. 1 is a sectional view showing a schematic construction of an arrangement wherein a rear-focus conversion lens device (RFC) according to the present invention is mounted between an objective lens and a single-lens reflex camera body.

FIG. 1 is a sectional view schematically showing an arrangement wherein an RFC 30 according to the present invention is mounted between an objective lens 10 and a single lens reflex camera body 20. The light rays illustrated in FIG. 1 are peripheral rays from the object point on the optical axis which reach a film surface 21. The camera body 20 has a pivotal reflecting mirror 22, a focusing plate 23, a condenser lens 24, a pentagonal roof prism 25, and an eyepiece 26. The reflecting mirror 22 is normally slanted at the position indicated by the dotted line except for during an exposure period of the film surface 21. In a single lens reflex camera, in order to guarantee a pivoting space for the pivotal reflecting mirror 22, the camera body 20 has a specific distance (i.e., a flange focal distance MB) between a lens mounting surface 28 of the camera body 20 and the film surface 21. The distance (back-focal distance $B_f$) between the rearmost lens surface of the objective lens and the image surface is designed to be sufficiently longer than the pivoting space of the reflecting mirror 22.

In the RFC 30, an inner barrel 32 having a negative lens group or system 34 is disposed within a converter barrel 31 so as to be moved by a focus ring 33 along the optical axis. Therefore, when the focus ring 33 is rotated about the optical axis, the negative lens group 34 is moved along the optical axis to the position at the image side indicated by the dotted line, thereby being focused on an object at a predetermined close distance.

For this reason, even if the RFC is mounted on the objective lens, the back-focal distance $B_f$ of the synthetic lens system consisting of the RFC and the objective lens must be greater than the pivoting space of the reflecting mirror 22. Even if the negative lens group 34 constituting the RFC 30 is moved to the image side for focusing on an object at a close distance, a sufficient back-focal distance must be guaranteed.

The RFC according to the present invention must satisfy the conditions for a rear-focus lens and various other conditions for achieving satisfactory focusing. More specifically, a certain upper limit is imposed on the enlargement factor of the RFC in order to allow satisfactory focusing even if bright or dark objective lenses are mounted to render the RFC a general-purpose RFC. In the case of close-up photography, a sufficient back-focal distance must be guaranteed. On the other hand, since it is not preferable to increase the displacement or shift of the RFC over a certain limit, there is also a lower limit of the enlargement factor obtainable with the RFC.

In a telephoto lens, the back-focal distance is generally long, and the position of the exit pupil is farther from the image surface than in the standard lens. In view of this, the RFC according to the present invention must have an arrangement different from that of an RFC of a standard lens. First, since the position of the exit pupil of the objective lens is far from the image surface, the entrance pupil of the RFC of a telephoto lens must also be far from the image surface. Since the back-focal distance of the objective lens is long, in the RFC for a telephoto lens, a distance do (i.e., the object point distance of the RFC) between the vertex of the lens surface of the RFC which is closest to the object and the image point formed by the objective lens can be set to be longer than that of a standard RFC lens. In addition, the back-focal distance in an infinity in-focus state when the RFC is mounted on an objective lens can be set to be long. Since the distance do can be set to be relatively long, when the RFC is mounted on an objective lens having a far exit pupil position, a sufficient peripheral light amount can be obtained. However, when the RFC is focused on an object at a finite distance therefrom by moving it toward the image side, the amount of displacement of the RFC required to obtain a predetermined photographing magnification increases with an increase in the focal length of the objective lens. Therefore, in an infinity in-focus state obtained when the RFC is mounted on the objective lens, the back-focal distance of the synthetic lens system must be long to assure a sufficient displacement amount of the RFC. For the purpose of assuring a sufficiently long back-focal distance of the synthetic lens system, the lens components constituting the RFC must be disposed as close as possible to the objective lens and the overall thickness of the RFC must be minimized.

The above relations to be satisfied according to the present invention will be described below. Relation (1) above defines the basic structure of the RFC. When the enlarging magnification $\beta$ is below the lower limit given by the relation (1), if the synthetic lens system is focused from infinity to a specific finite distance, the magnification becomes too low and the refracting power becomes too weak. Therefore, the displacement amount of the RFC becomes too large. However, when the enlarging magnification $\beta$ exceeds the upper limit, the negative refracting power of the RFC becomes too great. Then, the aberration correction becomes difficult, the number of lens components used increases, and the overall optical system becomes complex in construction. In addition to these disadvantages, the F-number of the synthetic lens system consisting of the RFC and the objective lens becomes too large, and the overall lens system becomes too dark. This results in a low focusing precision. Moreover, when automatic focus detection is performed, the amount of light received becomes small, and the response of the focus detecting sensor becomes long.

Relation (2) above relates to the focusing capacity of the RFC and defines the relationship between the movable region and the refracting power of the RFC in order to allow focusing from infinity to a practically sufficiently close distance. When the quantity $|\Delta B_f/F_R|$ exceeds the upper limit given by the relation (2), the refracting power of the RFC becomes too great a negative value, and the Petzval's sum also becomes too great a negative value. For this reason, the astigmatic difference also becomes too great, correction of the spherical aberration becomes difficult, and a good imaging performance cannot be obtained. When a single lens reflex camera lens which allows a large amount of displacement of the RFC is used so as to allow focusing and photographing within the entire range of most acceptable back-focal distance, the spherical aberration becomes too great a negative value and the astigmatism becomes too great a positive value when the lens is focused at a closest distance. However, when the quantity $|\Delta B_F/f_R|$ is below the lower limit, the focusing range obtainable with only the RFC becomes narrow, which is not preferable. The lower limit of the relation (2) is more preferably 0.09.

When the quantity $|B_f/do.\beta|$ is below the lower limit of the relation (3) above, the magnification of the RFC becomes great and aberration correction becomes difficult. When the absolute value of do becomes great, the number of the standard objective lenses on which the RFC may be mounted becomes too small and the synthetic lens system becomes less general-purpose. When the back-focal distance $B_f$ of the synthetic lens system is shortened, the focusing range is narrowed, and photography at a practically acceptable close distance cannot be performed. However, when the quantity $|B_f/do.\beta|$ exceeds the upper limit, the magnification becomes too small. When focusing on an object at a finite distance is performed at a specific magnification with only the RFC, the amount of displacement of the RFC becomes too great. Then, the back-focal distance of the RFC must be very long. However, when the back-focal distance is set to be long, the overall central thickness of the RFC must be shortened. Then, the lens arrangement of the RFC is concentrated at the side of the objective lens. This significantly impairs the degree of freedom of possible correction of spherical aberration and astigmatism. Therefore, it becomes difficult to maintain an excellent and stable imaging performance in infinity and close distance focusing.

The RFC for a telephoto lens according to the present invention preferably satisfies:

$$0.41 < \Sigma d/MB < 1.5 \qquad \ldots (4)$$

where $\Sigma d$ is the overall central thickness of the RFC (the distance between the vertex of the frontmost lens surface to the vertex of the rearmost lens surface of the RFC), and MB is the flange back of the camera body to which the RFC is mounted. When the ratio Σd/MB exceeds the upper limit of the relation (4) above, the lens length of the RFC becomes too great. The RFC cannot then be made compact in size, and the back-focal length becomes short, thus narrowing the focusing range. When the ratio Σd/MB is below the lower limit correction of the aberration variation, especially that upon focusing, becomes difficult. Furthermore, since the thickness at the periphery of the positive lens component is reduced, it becomes difficult to maintain the aperture required to secure a sufficient peripheral light amount.

In the RFC according to the present invention, focusing can be performed by moving only the RFC while the objective lens is fixed in position relative to the image surface. However, if focusing is performed by moving the RFC while moving the objective lens relative to the image surface, a focusing range for photography can further be widened. When TL is the total length (the distance from the frontmost lens surface of the objective lens to the image surface of the synthetic lens system) of the synthetic lens system consisting of the objective lens and the RFC in an infinity in-focus state, and when it is assumed that the total length is changed by ΔTL upon focusing to a finite distance, the following relation is further preferably satisfied:

$$|\Delta TL/TL| < 0.2 \qquad \ldots (5)$$

When the ratio $|\Delta TL/TL|$ falls outside this range, an arrangement for contracting/expanding the barrel of the RFC so as to move the objective lens relative to the image surface becomes complex and large in size. However, if the objective lens is focused on an object at a close distance by manually moving the distance ring of the objective lens or the like independently of the operation of the RFC, this condition need not be satisfied.

In the basic construction of the RFC according to the present invention as described above, the lens arrangement can be an arrangement wherein a positive lens is arranged closest to the object or an arrangement wherein a negative lens is arranged closest to the object. A description will now be made with respect to the arrangement wherein a positive lens is arranged closest to the object.

In an RFC wherein a positive lens is arranged closest to the object, this positive lens is arranged as a first unit $G_1$ which is sequentially followed by a second unit $G_2$ consisting of a negative lens and a positive lens which are adhered to each other or separated from each other, and a third unit $G_3$ consisting of a negative lens and a positive lens. In the RFC of the construction wherein a positive lens is arranged closest to the object, the field curvature is small and correction of coma at an intermediate angle of view is easy. However, since the chromatic aberration on the axis and chromatic aberration of high order of spherical aberration tend to appear having negative values, they must be corrected properly. When a space between the second and third group $G_2$ and $G_3$ is represented by $D_3$, the following relation is preferably satisfied:

$$0.035 < |D_3/f_R| < 0.2 \qquad \ldots (6)$$

When the quantity $|D_3/f_R|$ exceeds the upper limit, the total length of the RFC becomes too long, and the back-focal distance becomes too short. Since the value of $f_R$ also becomes small and the refracting power becomes too strong, correction of the astigmatism and astigmatic difference becomes difficult. However, when the quantity $|D_3/f_R|$ is below the lower limit, the total length of the RFC becomes too short, and the allowable degree of freedom wherein aberrations may be corrected is narrowed. In addition, the value of $f_R$ becomes too great, and the amount of displacement of the RFC becomes too great. This is not proper.

In an RFC wherein a positive lens is located closest to the object, the following relations are preferably satisfied:

$$|f_3/f_{12}| < 3.0 \qquad \ldots (7)$$

$$|f_R/f_3| < 1.0 \qquad \ldots (8)$$

$$0.3 < |d_o/f_R| < 0.7 \qquad \ldots (9)$$

$$|P_z f_R| < 0.35 \qquad \ldots (10)$$

where $f_{12}$ is a synthetic focal length of the first and second units $G_1$ and $G_2$, $f_3$ is the focal length of the third unit $G_3$, and $P_z$ is the Petzval's sum.

Relations (7) and (8) define the optimal refracting power distribution of the RFC wherein a positive lens is closest to the object. When the quantities $|f_3/f_{12}|$ and $|f_R/f_3|$ fall outside these predetermined ranges, various aberrations cannot be corrected with good efficiency. When the quantity $|d_o/f_R|$ exceeds the upper limit of the relation (9), the value of $d_o$ becomes too great, and then the overall system cannot serve as a general-purpose system. However, when the quantity $|d_o/f_R|$ is lower than the lower limit, a sufficient back-focal distance cannot be guaranteed, and the focusing range becomes narrow. Relation (10) defines the optical ranges of the astigmatism and field curvature. For use in a 35-mm single lens reflex camera, the RFC for a telephoto lens preferably satisfies the following relation:

$$0.82 < d_o/MB < 2.8 \qquad \ldots (11)$$

An example of the flange back MB of a 35-mm single lens reflex camera is 46.5 mm. The focal length $f_1$ of the first unit $G_1$ preferably satisfies the following relation:

$$0.6 < |f_1/f_R| < 1.45 \qquad \ldots (12)$$

In this case, the condition of the relation (4) above is preferably replaced with:

$$0.415 < \Sigma d/MB < 0.7$$

Embodiments of RFCs wherein the positive lens is arranged closest to the object are described below. Each embodiment is designed using the telephoto lens shown in Table 1 as a standard objective lens. This standard objective lens is for use in a 35-mm single lens reflex camera and is bright (300 mm focal length, and 2.0 F-number). A patent has also been applied for this standard objective lens by the same applicant as of the present application. Referring to Table 1 below, $r_1$, $r_2$, $r_3$, ..., denote the radii of curvature of the respective lenses from the side of the object; $d_1$, $d_2$, $d_3$ denote the central thicknesses and spaces of the respective lenses; $n_1$, $n_2$, $n_3$, ..., denote the refractive indices of the respective lenses for the d-line ($\lambda = 587.6$ nm); and $\nu_1$, $\nu_2$, $\nu_3$, ..., denote the Abbe numbers of the respective lenses. Note that each objective lens incorporates a filter P at a position closest to the image side.

TABLE 1

(Standard objective lens)
Focal distance: f = 300, F-number 2.0

| r1 = 443.373 | d1 = 14.500 | n1 = 1.49782 | ν1 = 82.3 |
| r2 = −745.663 | d2 = 0.500 | | |
| r3 = 235.410 | d3 = 21.000 | n2 = 1.49782 | ν2 = 82.3 |
| r4 = −599.816 | d4 = 6.850 | | |
| r5 = −527.848 | d5 = 6.000 | n3 = 1.74950 | ν3 = 35.2 |
| r6 = 473.787 | d6 = 1.700 | | |
| r7 = 176.900 | d7 = 15.000 | n4 = 1.49782 | ν4 = 82.3 |
| r8 = 558.189 | d8 = 102.701 | | |
| r9 = 749.672 | d9 = 8.000 | n5 = 1.79504 | ν5 = 28.6 |
| r10 = −189.496 | d10 = 3.650 | n6 = 1.51454 | ν6 = 54.6 |
| r11 = 125.271 | d11 = 12.000 | | |
| r12 = −148.765 | d12 = 4.800 | d7 = 1.46450 | μ7 = 65.8 |
| r13 = 97.985 | d13 = 28.388 | | |
| r14 = −1754.216 | d14 = 1.500 | n8 = 1.68893 | ν8 = 31.1 |
| r15 = 110.000 | d15 = 7.750 | n9 = 1.69350 | ν9 = 53.8 |
| r16 = −317.940 | d16 = 2.000 | | |
| r17 = 169.454 | d17 = 2.400 | n10 = 1.69895 | ν10 = 30.1 |
| r18 = 113.525 | d18 = 8.000 | n11 = 1.69680 | ν11 = 55.6 |
| r19 = −254.060 | Bf = 112.223 | | |

(Filter having a thickness of 2.0 mm, a refractive index of 1.5168 and an Abbe number of 64.1 is disposed at a position of 31.504 behind r19.)

Tables 2 to 5 below show numerical data of RFCs according to the first to fourth embodiments which have positive lenses at the object side among the various embodiments according to the present invention. In Tables 2 to 5, the numbers at the left column indicate the order from the object side; do, the distance between the frontmost lens surface of the RFC and the image point by the objective lens; Do, the distance from the frontmost lens surface of the objective lens and the image point; $D_1$, the air space between the objective lens and the RFC; $f_1$ and $f_2$, focal lengths of the first and second units $G_1$ and $G_2$, respectively; $f_{12}$, the synthetic focal distance of the first and second units $G_1$ and $G_2$ of the RFC; $f_3$, the focal length of the third unit $G_3$ of the RFC; $\Delta B_f$, the amount of change in the back-focal distance in infinity and closest distance in-focus states of the RFC; F, a synthetic focal length of the RFC and the objective lens; M, the magnification of the synthetic focal length of the RFC and the objective lens; and $P_z$, the Petzval's sum of the RFC.

TABLE 2

(First embodiment)
Magnification: β = 1.6  Focal distance $f_R$ = −119.468

| | No. | Radius of curvature r | Central thickness and space d of lens | Refractive index n | Abbe number ν |
|---|---|---|---|---|---|
| $G_1$ | 1 | 147.500 | 4.000 | 1.59507 | 35.5 |
| | 2 | −134.950 | 0.500 | | |
| $G_2$ | 3 | 236.060 | 2.000 | 1.84042 | 43.3 |
| | 4 | 38.360 | 1.500 | | |
| | 5 | 46.322 | 6.500 | 1.59507 | 35.5 |
| | 6 | −44.000 | 1.500 | 1.84042 | 43.3 |
| | 7 | 310.793 | 6.000 | | |
| $G_3$ | 8 | −80.603 | 2.000 | 1.84042 | 43.3 |
| | 9 | 468.377 | 0.200 | | |
| | 10 | 66.100 | 4.000 | 1.51454 | 54.6 |
| | 11 | −719.875 | | | |

F = 480.0    M = −0.066

| $D_0$ | ∞ | 6397.997 |
| $D_1$ | 19.400 | 45.400 |
| $B_f$ | 65.932 | 39.932 |

$d_0$ = −60.0   $\Delta B_f$ = 26.0
$f_1$ = 119.057   $P_z$ = −0.00102
$f_{12}$ = −208.725

TABLE 2-continued (First embodiment)
Magnification: β = 1.6  Focal distance $f_R$ = −119.468

$f_3$ = −276.474

TABLE 3

(Second embodiment)
Magnification: β = 1.6  Focal distance $f_R$ = −114.497

| | No. | Radius of curvature r | Central thickness and space d of lens | Refractive index n | Abbe number ν |
|---|---|---|---|---|---|
| $G_1$ | 1 | 149.300 | 3.500 | 1.60342 | 38.1 |
| | 2 | −127.711 | 1.000 | | |
| $G_2$ | 3 | 277.893 | 1.800 | 1.84042 | 43.3 |
| | 4 | 30.046 | 8.000 | 1.60342 | 38.1 |
| | 5 | −41.193 | 1.800 | 1.84042 | 43.3 |
| | 6 | 191.911 | 6.000 | | |
| $G_3$ | 7 | −78.442 | 2.000 | 1.80411 | 46.1 |
| | 8 | 356.985 | 0.200 | | |
| | 9 | 77.355 | 4.000 | 1.54814 | 45.9 |
| | 10 | −269.887 | | | |

F = 480.0    M = −0.063

| $D_0$ | ∞ | 6653.544 |
| $D_1$ | 19.400 | 44.400 |
| $B_f$ | 64.698 | 39.698 |

$d_0$ = −60.00   $\Delta B_f$ = 25.0
$f_1$ = 114.61   $P_z$ = −0.00093
$f_{12}$ = −178.435
$f_3$ = −306.972

TABLE 4

(Third embodiment)
Magnification: β = 1.6  Focal distance $f_R$ = −104.384

| | No. | Radius of curvature r | Central thickness and space d of lens | Refractive index n | Abbe number ν |
|---|---|---|---|---|---|
| $G_1$ | 1 | 254.983 | 3.500 | 1.59507 | 35.5 |
| | 2 | −117.209 | 0.200 | | |
| $G_2$ | 3 | 834.330 | 1.800 | 1.79668 | 45.5 |
| | 4 | 26.007 | 5.000 | 1.59507 | 35.5 |
| | 5 | 49.576 | 1.000 | | |
| | 6 | 51.090 | 4.000 | 1.59507 | 35.5 |
| | 7 | 221.927 | 6.000 | | |
| $G_3$ | 8 | −54.790 | 2.000 | 1.84042 | 43.3 |
| | 9 | 468.187 | 0.200 | | |
| | 10 | 61.012 | 5.000 | 1.51118 | 50.9 |
| | 11 | −434.122 | | | |

F = 480.0    M = −0.042

| $D_0$ | ∞ | 10468.529 |
| $D_1$ | 26.1 | 41.291 |
| $B_f$ | 55.867 | 40.675 |

$d_0$ = −53.300   $\Delta B_f$ = 15.191
$f_1$ = 135.414   $P_z$ = −0.00242
$f_{12}$ = −457.613
$f_3$ = −135.458

TABLE 5

(Fourth embodiment)
Magnification: β = 1.4  Focal distance $f_R$ = −179.805

| | No. | Radius of curvature r | Central thickness and space d of lens | Refractive index n | Abbe number ν |
|---|---|---|---|---|---|
| $G_1$ | 1 | 171.000 | 4.000 | 1.59507 | 35.5 |
| | 2 | −116.775 | 1.000 | | |
| $G_2$ | 3 | −237.148 | 1.800 | 1.84042 | 43.3 |
| | 4 | 40.696 | 0.800 | | |
| | 5 | 46.330 | 4.500 | 1.59507 | 35.5 |
| | 6 | 1187.691 | 11.500 | | |
| | 7 | −61.989 | 1.800 | 1.84042 | 43.3 |

TABLE 5-continued (Fourth embodiment)
Magnification: β = 1.4  Focal distance $f_R$ = −179.805

| | | Radius | d | n | ν |
|---|---|---|---|---|---|
| G₃ | 8 | 468.108 | 0.200 | | |
| | 9 | 68.202 | 6.300 | 1.53172 | 49.1 |
| | 10 | −115.778 | | | |

F = 420.0   M = −0.033

| D₀ | ∞ | 11833.485 |
|---|---|---|
| D₁ | 19.400 | 36.301 |
| B_f | 54.965 | 38.063 |

Figure 2:
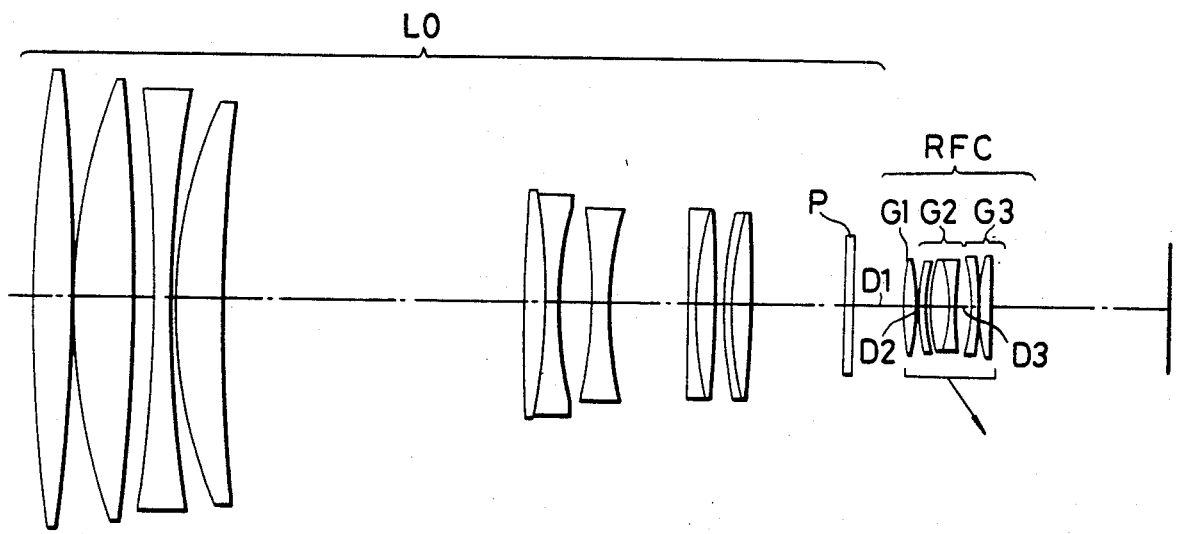
FIG. 2 is a view showing the overall arrangement wherein an RFC according to a first embodiment of the present invention is mounted on a telephoto lens.
Figure 3:
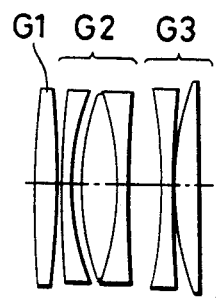
FIGS. 3 to 6 show the lens arrangements according to the first to fourth embodiments of the present invention.
Figure 4:
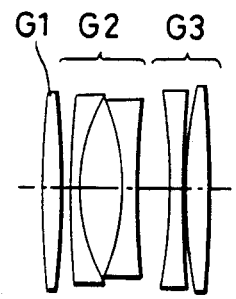
Figure 5:
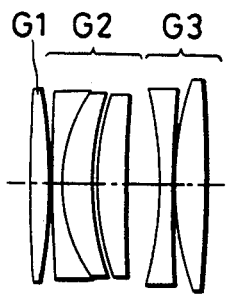
Figure 6:
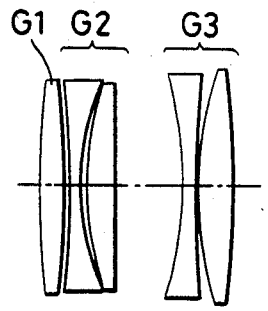

$d_0 = -60.000$   $\Delta B_f = 16.901$
$f_1 = 117.215$   $P_z = -0.00025$
$f_{12} = -341.438$
$f_3 = -378.105$ FIG. 2 shows the overall optical system arrangement according to an RFC according to a first embodiment of the present invention and the standard objective lens Lo shown in Table 1. Symbol P in FIG. 2 denotes a filter provided for the objective lens.

FIGS. 3 to 6 respectively show the lens arrangements according to the first to fourth embodiments of the present invention.

Various aberrations obtained when the RFCs of the first to fourth embodiments of the present invention are mounted on the standard objective lens as shown in Table 1 will sequentially be described with reference to FIGS. 7A and 7B to FIGS. 10A and 10B. Note that FIGS. 7A through 10A show various aberrations in an infinity in-focus state when the corresponding RFCs are mounted, and FIGS. 7B through 10B show various aberrations in a close distance in-focus state by the corresponding RFCs. Also note that FIGS. 7A and 7B to FIGS. 10A and 10B, respectively, show the spherical aberration, astigmatism, distortion and lateral chromatic aberrations of the y-line (λ=435.8 nm) for the standard wavelength d-line (λ=587.6 nm).

Embodiments wherein a negative lens is closest to the object will be described among the RFCs according to the various embodiments of the present invention. In this case, the negative lens closest to the object must be a negative meniscus lens having a convex surface facing toward the object side. A first unit G₁ has a positive refracting power and consists of this negative meniscus lens and a positive lens. A second unit G₂ arranged next to the first unit G₁ has a synthetic negative refracting power and at least two lenses which are separated from each other or cemented to each other (preferably three positive, negative and positive lenses). A third unit G₃ next to the second unit G₂ has a positive refracting power and a positive meniscus lens at the image side having a convex surface facing toward the object side. In the RFC having such a construction, correction of the chromatic aberration on the axis and chromatic aberration of the spherical aberration of higher order can be conveniently performed. However, the field curvature tends to occur more frequently, and correction of coma around an intermediate angle of field is more difficult to correct than in the case wherein the positive lens is closest to the object as described above. In the RFC wherein a negative lens is closest to the object, when the focal lengths of the first, second and third units are respectively represented by $f_1$, $f_2$ and $f_3$, and the synthetic focal length of the second and third units is represented by $f_{23}$, the following relations are preferably satisfied so as to correct various aberrations satisfactorily:

$$0.9 < |f_1/f_R| < 1.45 \qquad \ldots (13)$$

$$0.3 < |f_2/f_R| < 0.5 \qquad \ldots (14)$$

$$1.0 < |f_3/f_R| < 3.0 \qquad \ldots (15)$$

$$0.4 < |f_{23}/f_R| < 0.6 \qquad \ldots (16)$$

$$0.3 < |f_{23}/f_1| < 0.55 \qquad \ldots (17)$$

In this case, the relation (4) above must be replaced with:

$$0.41 < \Sigma d/MB < 0.7$$

Tables 6 to 8 show numerical data of the RFCs of the fifth to seventh embodiments of the present invention wherein a negative lens is closest to the object. The various symbols in these tables have the same or similar meanings as those in Table 2 and the like.

TABLE 6

(Fifth embodiment)
Magnification: β = 1.6   Focal distance $f_R$ = −122.628

| | No. | Radius of curvature r | Central thickness and space d of lens | Refractive index n | Abbe number ν |
|---|---|---|---|---|---|
| G₁ | 1 | 98.000 | 2.000 | 1.84042 | 43.3 |
| | 2 | 41.023 | 1.200 | | |
| | 3 | 54.702 | 6.000 | 1.59507 | 35.5 |
| | 4 | −69.796 | 2.000 | | |
| G₂ | 5 | −76.370 | 1.500 | 1.84042 | 43.3 |
| | 6 | 86.931 | 5.000 | 1.59507 | 35.3 |
| | 7 | −80.858 | 2.000 | | |
| | 8 | −76.139 | 1.500 | 1.84042 | 43.3 |
| | 9 | 189.300 | .200 | | |
| G₃ | 10 | 47.540 | 4.100 | 1.51835 | 60.3 |
| | 11 | 103.582 | | | |

F = 480.0   M = −0.073

| D₀ | ∞ | 5647.126 |
|---|---|---|
| D₁ | 19.400 | 49.400 |
| B_f | 70.025 | 40.025 |

$d_0 = -60.00$   $\Delta B_f = 30.0$
$f_1 = 128.177$   $P_z = -0.00116$
$f_2 = -44.151$
$f_3 = 165.383$

TABLE 7

(Sixth embodiment)
Magnification: β = 1.6   Focal distance $f_R$ = −111.226

| | No. | Radius of curvature r | Central thickness and space d of lens | Refractive index n | Abbe number ν |
|---|---|---|---|---|---|
| G₁ | 1 | 99.500 | 1.500 | 1.84042 | 43.3 |
| | 2 | 29.984 | 7.500 | 1.60342 | 38.1 |
| | 3 | −83.235 | 2.000 | | |
| G₂ | 4 | −90.413 | 1.500 | 1.84042 | 43.3 |
| | 5 | 65.000 | 6.000 | 1.60342 | 38.1 |
| | 6 | −70.019 | 2.000 | | |
| | 7 | −71.646 | 1.500 | 1.84042 | 43.3 |
| G₃ | 8 | 187.066 | 200 | | |
| | 9 | 43.600 | 3.500 | 1.54814 | 45.9 |
| | 10 | 59.309 | | | |

F = 480.0   M = −0.063

| D₀ | ∞ | 6678.992 |
|---|---|---|
| D₁ | 19.400 | 44.400 |
| B_f | 67.300 | 42.300 |

$d_0 = -60.00$   $\Delta B_f = 25.0$
$f_1 = 128.599$   $P_z = -0.00114$
$f_2 = -47.201$
$f_3 = 278.352$

TABLE 8

(Seventh embodiment)
Magnification: $\beta = 1.6$  Focal distance $f_R = -116.029$

| | No. | Radius of curvature r | Central thickness and space d of lens | Refractive index n | Abbe number $\nu$ |
|---|---|---|---|---|---|
| $G_1$ | 1 | 131.700 | 1.500 | 1.84042 | 43.3 |
| | 2 | 31.554 | 7.500 | 1.60342 | 38.1 |
| | 3 | −82.901 | 4.300 | | |
| $G_2$ | 4 | −90.089 | 1.500 | 1.84042 | 43.3 |
| | 5 | 70.000 | 5.000 | 1.59507 | 35.5 |
| | 6 | −70.000 | 1.500 | 1.84042 | 43.3 |
| | 7 | 414.230 | .300 | | |
| $G_3$ | 8 | 43.700 | 3.500 | 1.48749 | 70.2 |
| | 9 | 61.331 | | | |

F = 480.0   M = −0.065

| | | |
|---|---|---|
| $D_0$ | ∞ | 6422.542 |
| $D_1$ | 19.400 | 45.400 |
| $B_f$ | 68.640 | 42.640 |
| $d_0 = -60.00$ | | $\Delta B_f = 26.0$ |
| $f_1 = 161.613$ | | $P_z = -0.00094$ |
| $f_2 = -53.514$ | | |
| $f_3 = 292.786$ | | |

Figure 11:
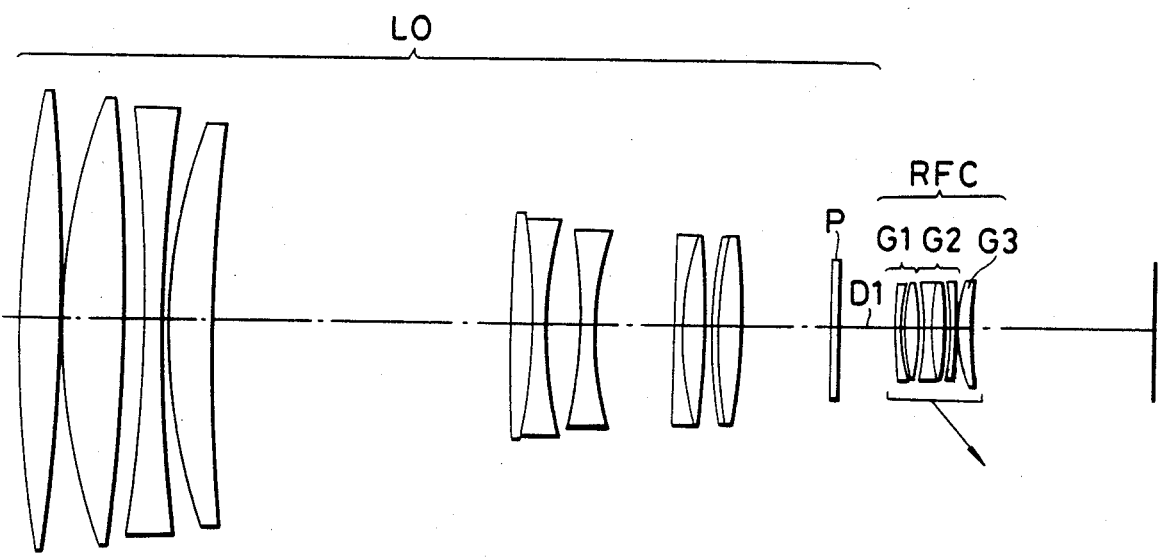
FIG. 11 shows the overall arrangement showing a state wherein an RFC according to a fifth embodiment of the present invention is mounted on a telephoto lens.
Figure 12:
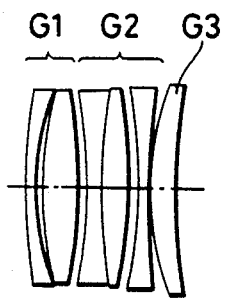
FIGS. 12 to 14 show lens arrangements according to fifth to seventh embodiments of the present invention.
Figure 13:
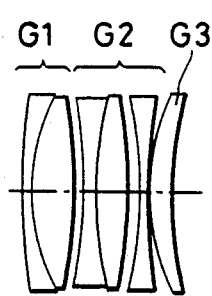
Figure 14:
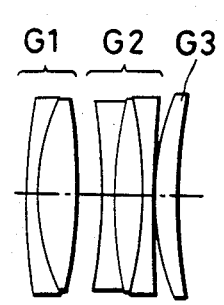
Figure 15A:
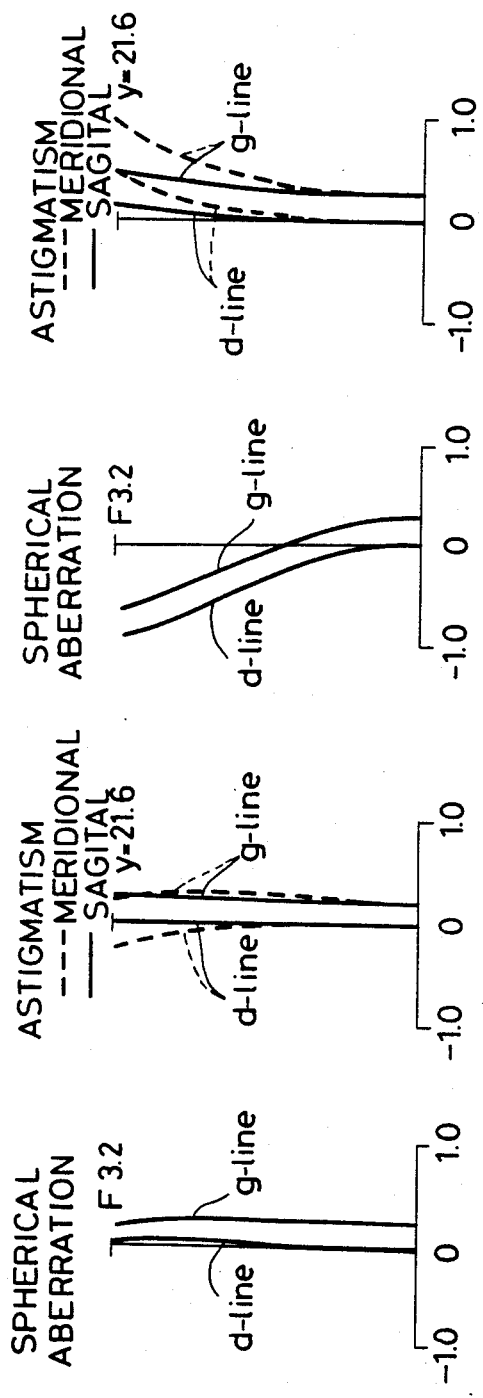
Figure 15B:
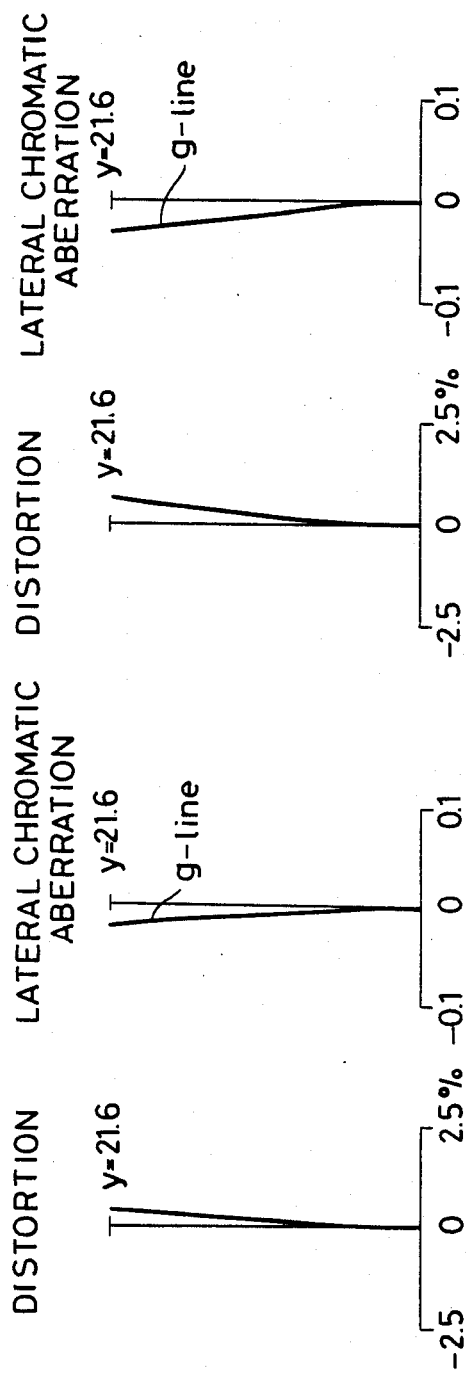
Figures 16A, 16B:
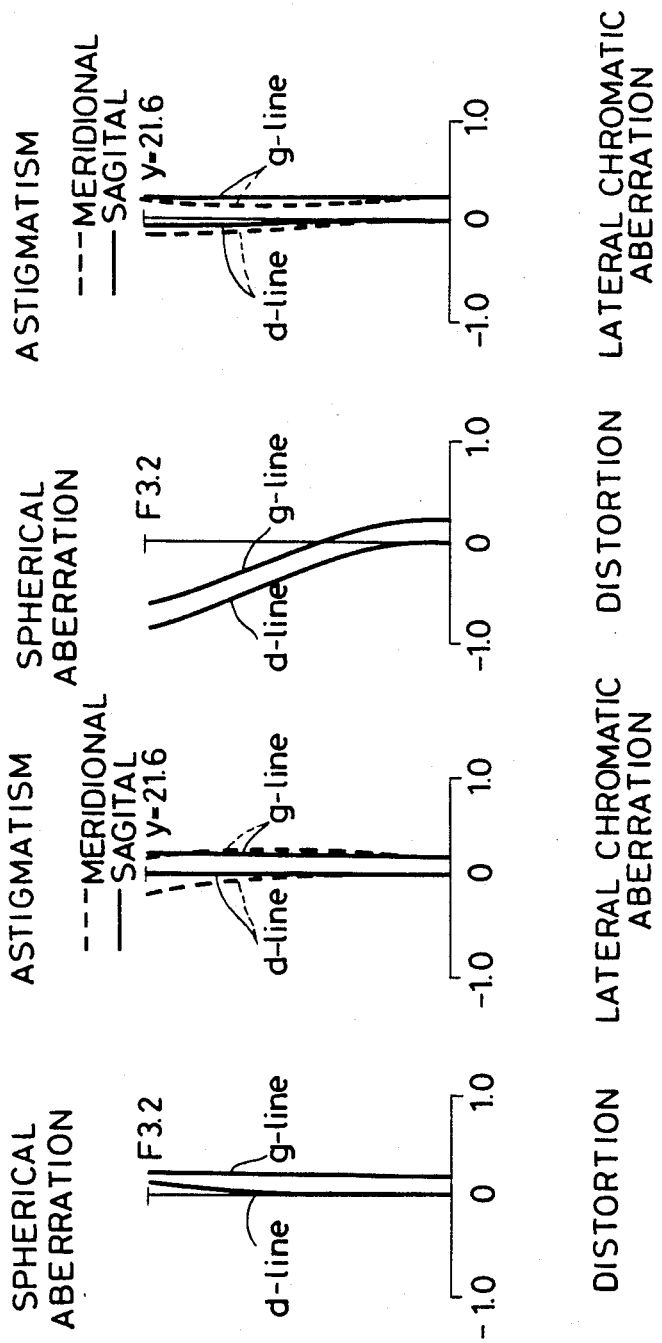
Figure 18:
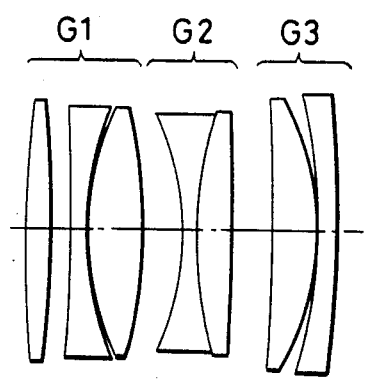
FIGS. 18 to 21 show lens arrangements according to eighth to eleventh embodiments of the present invention.
Figure 19:
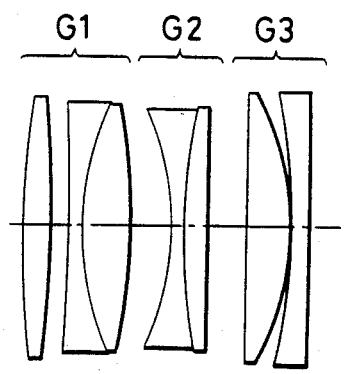
Figure 20:
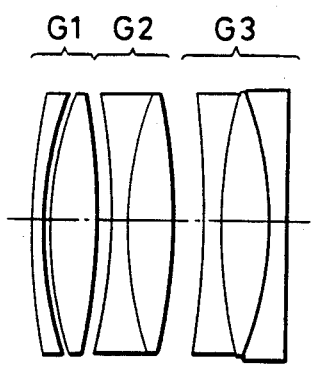
Figure 21:
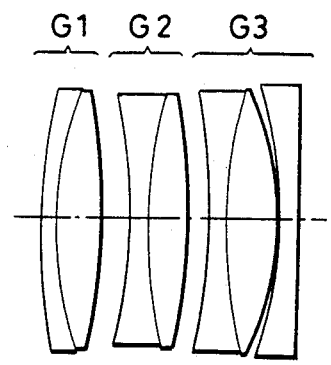

FIG. 11 shows the overall optical system wherein the RFC of the fifth embodiment is mounted on a standard objective lens Lo shown in Table 1. FIGS. 12 to 14 sequentially show the lens arrangements according to the fifth to seventh embodiments of the present invention.

FIGS. 15A and 15B to 17A and 17B respectively show various aberrations when the RFCs of the fifth to seventh embodiments are mounted on the standard objective lens shown in Table 1. FIGS. 15A and 15B to 17A and 17B are similar to FIGS. 7A and 7B.

The present invention has been described with reference to the embodiments wherein the lens closest to the object is a positive lens (first to fourth embodiments) and the embodiments wherein the lens closest to the object is a negative lens (fifth to seventh embodiments). However, the rear third unit $G_3$ of the RFC can also have the following arrangement. More specifically, the third unit $G_3$ can consist, in the order from the side of the object, of a positive lens having a surface of greater curvature facing the image side, and a negative lens having a surface of greater curvature facing the object side. When such a rear third group is adopted, the exit pupil of the synthetic optical lens consisting of the RFC and the objective lens can be drawn closer to the image surface. As a result, even if the lens aperture of the RFC is reduced, a sufficient peripheral light amount can be assured.

More specifically, it is preferable to satisfy the following relations:

$$0.65 < Q_n < 3.5 \quad \ldots (18)$$

$$-3.5 < Q_p < -0.8 \quad \ldots (19)$$

where $Q_n$ is the shape factor of the negative lens of the third unit $G_3$, and $Q_p$ is the same of the positive lens thereof. Note that a shape factor Q is given by Q=(R2+R1)/(R2−R1) where R1 and R2 are radii of curvature of lens surfaces of a lens which are at the sides of the object and image, respectively.

When the shape factor $Q_n$ is below the lower limit given by the relation (18), the spherical aberration, astigmatism and distortion become too great negative values, which is disadvantageous, particularly when focusing on an object at a close distance. However, when the shape factor $Q_n$ exceeds the upper limit, the spherical aberration, astigmatism and distortion become too great positive values, resulting in inconvenience. When the shape factor $Q_p$ is below the lower limit given by the relation (19), the spherical aberration and the astigmatism become too great negative values. However, when the shape factor $Q_p$ exceeds the upper limit, the astigmatism and distortion become too great positive values, also resulting in inconvenience.

The positive lens in the third unit $G_3$ can be a single lens component or cemented lens component consisting of a plurality of lenses. However, the positive lens in the third unit is preferably a positive meniscus lens having a convex surface facing toward the image side. The negative lens in the third unit is preferably a negative lens having a surface of greater radius of curvature facing toward the object.

For the third unit of such an arrangement, the front groups can comprise, as in eighth to eleventh embodiments to be described below and from the side of the object sequentially, a first unit $G_1$ consisting of a negative lens and a positive lens which are cemented to each other or separated from each other, and a second unit $G_2$ consisting of cemented negative lenses. Alternatively, the front groups can sequentially comprise, in the order from the side of the object, a first unit $G_1$ consisting of a negative meniscus lens having a convex surface facing the object side and a positive lens which are adhered to each other or separated from each other; and a second unit $G_2$ consisting of meniscus lenses which are cemented to each other and which have convex surfaces facing toward the image side. The synthetic focal length of the front units $G_1$ and $G_2$ and the rear unit $G_3$ is a negative value. When the front units have a negative refracting power, the rear unit preferably has a positive refracting power. When the front units have a positive refracting power, the rear unit has a negative refracting power.

When the front units have a negative refracting power, a negative lens is preferably arranged at a position of the first units which is closest to the object. However, when the front units have a positive refracting power, a positive lens is preferably arranged at a position of the first units which is closest to the object.

Tables 9 to 12 below show various specifications of the eighth to eleventh embodiments having the rear groups of the construction as described above. Symbols in these tables have the same meanings as in Table 2 or the like.

TABLE 9

(Eighth embodiment)
Magnification: $\beta = 1.6$  Focal distance $f_R = -101.191$

| | No. | Radius of curvature r | Central thickness and space d of lens | Refractive index n | Abbe number $\nu$ |
|---|---|---|---|---|---|
| $G_1$ | 1 | 140.057 | 2.80 | 1.53172 | 49.1 |
| | 2 | −99.520 | 2.00 | | |
| | 3 | −171.493 | 1.50 | 1.84042 | 43.3 |
| | 4 | 35.217 | 0.20 | | |
| | 5 | 31.799 | 5.60 | 1.59507 | 35.5 |
| | 6 | −52.887 | 4.00 | | |
| $G_2$ | 7 | −31.666 | 1.50 | 1.84042 | 43.3 |
| | 8 | 43.500 | 3.80 | 1.59507 | 35.5 |
| | 9 | −280.571 | 4.00 | | |
| $G_3$ | 10 | −250.255 | 4.80 | 1.51454 | 54.6 |
| | 11 | −28.039 | 0.20 | | |
| | 12 | −52.701 | 1.80 | 1.84042 | 43.3 |
| | 13 | −132.306 | | | |

TABLE 9-continued (Eighth embodiment)
Magnification: $\beta = 1.6$  Focal distance $f_R = -101.191$

| F = 480.0 | M = −0.023 |
|---|---|
| $D_0$  ∞ | 19611.058 |
| $D_1$  30.450 | 38.266 |
| $B_f$  46.050 | 38.233 |
| $d_0 = -48.95$  $\Delta B_f = 7.817$ | $Q_p = -1.252$ |
| $f_{12} = -56.563$  $P_z = -0.00034$ | $Q_n = 2.324$ |
| $f_3 = 147.364$ | |

TABLE 10

(ninth embodiment)
Magnification: $\beta = 1.6$  Focal distance $f_R = -96.124$

| | No. | Radius of curvature r | Central thickness and space d of lens | Refractive index n | Abbe number ν |
|---|---|---|---|---|---|
| $G_1$ | 1 | 102.300 | 3.10 | 1.51118 | 50.9 |
| | 2 | −105.405 | 2.00 | | |
| | 3 | −212.856 | 1.30 | 1.84042 | 43.3 |
| | 4 | 33.501 | 5.30 | 1.59507 | 35.5 |
| | 5 | −52.401 | 4.00 | | |
| $G_2$ | 6 | −30.249 | 1.30 | 1.84042 | 43.3 |
| | 7 | 59.519 | 2.80 | 1.59507 | 35.5 |
| | 8 | −428.394 | 4.00 | | |
| | 9 | −6054.000 | 4.80 | 1.54814 | 45.9 |
| $G_3$ | 10 | −28.207 | 0.20 | | |
| | 11 | −60.000 | 1.80 | 1.84042 | 43.3 |
| | 12 | −440.553 | | | |

| F = 480.0 | M = −0.023 |
|---|---|
| $D_0$  ∞ | 19612.482 |
| $D_1$  30.450 | 38.281 |
| $B_f$  46.225 | 38.395 |
| $d_0 = -48.95$ | $\Delta B_f = 7.830$ |
| $f_{12} = -83.436$ | $P_z = -0.00071$ |
| $f_3 = 135.681$ | $Q_p = -1.009$ |
| | $Q_n = 1.315$ |

TABLE 11

(Tenth embodiment)
Magnification: $\beta = 1.6$  Focal distance $f_R = -77.575$

| | No. | Radius of curvature r | Central thickness and space d of lens | Refractive index n | Abbe number ν |
|---|---|---|---|---|---|
| $G_1$ | 1 | 71.700 | 1.30 | 1.84042 | 43.3 |
| | 2 | 38.824 | 0.50 | | |
| | 3 | 35.462 | 5.00 | 1.57501 | 41.5 |
| | 4 | −67.154 | 1.50 | | |
| $G_2$ | 5 | −56.993 | 1.50 | 1.84042 | 43.3 |
| | 6 | 40.000 | 5.00 | 1.60342 | 38.1 |
| | 7 | −51.885 | 3.00 | | |
| | 8 | −80.122 | 1.50 | 1.84042 | 43.3 |
| | 9 | 50.000 | 5.00 | 1.60342 | 38.1 |
| $G_3$ | 10 | −38.302 | 0.20 | | |
| | 11 | −39.521 | 1.80 | 1.84042 | 43.3 |
| | 12 | −1323.872 | | | |

| F = 480.0 | M = −0.023 |
|---|---|
| $D_0$  ∞ | 19615.700 |
| $D_1$  30.450 | 38.355 |
| $B_f$  47.307 | 39.403 |
| $d_0 = -48.95$ | $\Delta B_f = 7.904$ |
| $f_{12} = 158.163$ | $P_z = -0.00112$ |
| $f_3 = -49.018$ | $Q_p = -2.832$ |
| | $Q_n = 1.062$ |

TABLE 12

(Eleventh embodiment)
Magnification: $\beta = 1.6$  Focal distance $f_R = -79.834$

| | No. | Radius of curvature r | Central thickness and space d of lens | Refractive index n | Abbe number ν |
|---|---|---|---|---|---|
| $G_2$ | 1 | 61.260 | 1.30 | 1.84042 | 43.3 |
| | 2 | 35.462 | 5.00 | 1.54814 | 45.9 |
| | 3 | −66.991 | 3.00 | | |
| $G_2$ | 4 | −48.242 | 1.50 | 1.84042 | 43.3 |
| | 5 | 50.000 | 4.50 | 1.59507 | 35.5 |
| | 6 | −53.920 | 2.00 | | |
| | 7 | −75.319 | 1.50 | 1.84042 | 43.3 |
| | 8 | 50.000 | 5.50 | 1.61293 | 37.0 |
| $G_3$ | 9 | −34.509 | 0.20 | | |
| | 10 | −46.749 | 1.80 | 1.84042 | 43.3 |
| | 11 | 1310.653 | | | |

| F = 480.0 | M = −0.023 |
|---|---|
| $D_0$  ∞ | 19615.466 |
| $D_1$  30.450 | 38.344 |
| $B_f$  47.542 | 39.648 |
| $d_0 = -48.95$ | $\Delta B_f = 7.894$ |
| $f_{12} = 309.386$ | $P_z = -0.00107$ |
| $f_3 = -60.030$ | $Q_p = -2.691$ |
| | $Q_n = 0.931$ |

FIGS. 18 to 21 show the lens arrangements of the eighth to eleventh embodiments of the present invention.

FIGS. 22A and 22B to 25A and 25B show various aberrations when the RFCs of the eighth to eleventh embodiments are mounted on the standard objective lens shown in Table 1. FIGS. 22A and 22B to 25A and 25B respectively correspond to FIGS. 7A and 7B.

It is seen from these figures that the RFCs of these embodiments of the present invention have an excellent imaging performance not only in infinity focusing but also close distance focusing.

The objective lens used as shown in Table 1 has an F-number of 2.0 and is considerably bright. When the RFC of the present invention is mounted on such a bright telephoto lens, an excellent imaging performance can be obtained in both infinity and close distance focusing, thus demonstrating a satisfactory performance for a dark lens having a greater F-number. Therefore, the RFC according to the present invention is a general-purpose RFC for various types of telephoto lenses.

In summary, an RFC of the present invention can be mounted on various types of objective lenses, is compact in size, and can maintain an excellent imaging performance in both infinity and close distance focusing. When the RFC of the present invention is combined with an automatic focusing apparatus, since this single RFC allows focusing for various types of telephoto lenses, the focusing mechanism becomes common. Then, even if the telephoto lens is replaced, the focusing mechanism need not be replaced for each different telephoto lens.

I claim:

1. A rear-focus conversion lens device which is interposed between an objective lens and a camera body, provides with said objective lens a synthetic optical system having a synthetic focal length that exceeds a focal length of said objective lens, and has a focusing function, comprising:
a converter barrel detachably mounted between said objective lens and said camera body;
a lens system having a negative refracting power and movable within said converter barrel along an optical axis; and
moving means for moving said lens system along the optical axis, wherein said rear-focus lens device is focused on an object at infinity to an object at a close distance by moving said lens system along the optical axis, and the following relations are satisfied:

$$1.2 < \beta < 2.5 \quad \ldots (1)$$

$$0.05 < |\Delta B_f/f_R| < 0.35 \quad \ldots (2)$$

$$0.4 < |B_f/d_o.\beta| < 0.8 \quad \ldots (3)$$

$$0.41 < \Sigma d/MB < 1.5 \quad \ldots (4)$$

where $\beta$ is an enlarging magnification of a focal length in an infinity in-focus state, $\Delta B_f$ is an amount of change in a synthetic back-focal distance when said synthetic optical system is focused from an object at infinity to an object at a close distance, $f_R$ is a focal length of said rear-focus lens device, do is a distance between a vertex of a lens surface of said rear-focus conversion lens device which is closest to the object and an image point formed by said objective lens, MB is a distance between a mounting surface of said camera body on which said objective lens is mounted and a film surface, and $\Sigma d$ is a distance between a vertex of a frontmost lens surface of said lens system and a vertex of a rearmost lens surface thereof.

2. A rear-focus conversion lens deive according to claim 1, wherein said lens system comprises, in the order from the side of the object, a first lens unit having a positive lens, a second unit consisting of a negative lens and a positive lens which are cemented to each other or separated from each other, and a third unit consisting of a negative lens and a positive lens; and a space $D_3$ between said second and third group satisfies:

$$0.035 < |D_3/f_R| < 0.2.$$

3. A rear-focus conversion lens device according to claim 2, wherein the following numerical data are satisfied:

| | | Magnification: $\beta = 1.6$ Focal distance $f_R = -119.468$ | | | |
|---|---|---|---|---|---|
| | No. | Radius of curvature r | Central thickness and space d of lens | Refractive index n | Abbe number $\nu$ |
| $G_1$ | 1 | 147.500 | 4.000 | 1.59507 | 35.5 |
|       | 2 | −134.950 | 0.500 | | |
| $G_2$ | 3 | 236.060 | 2.000 | 1.84042 | 43.3 |
|       | 4 | 38.360 | 1.500 | | |
|       | 5 | 46.322 | 6.500 | 1.59507 | 35.5 |
|       | 6 | −44.000 | 1.500 | 1.84042 | 43.3 |
|       | 7 | 310.793 | 6.000 | | |
| $G_3$ | 8 | −80.603 | 2.000 | 1.84042 | 43.3 |
|       | 9 | 468.377 | 0.200 | | |
|       | 10 | 66.100 | 4.000 | 1.51454 | 54.6 |
|       | 11 | −719.875 | | | |

| F = 480.0 | | M = −0.066 |
|---|---|---|
| $D_0$ | ∞ | 6397.997 |
| $D_1$ | 19.400 | 45.400 |
| $B_f$ | 65.932 | 39.932 |
| $d_0 = -60.0$ | | $\Delta B_f = 26.0$ |
| $f_1 = 119.057$ | | $P_z = -0.00102$ |
| $f_{12} = -208.725$ | | |
| $f_3 = -276.474$ | | |

4. A rear-focus conversion lens device according to claim 2, wherein the following numerical data are satisfied:

| | | Magnification $\beta = 1.6$ Focal distance $f_R = -114.497$ | | | |
|---|---|---|---|---|---|
| | No. | Radius of curvature r | Central thickness and space d of lens | Refractive index n | Abbe number $\nu$ |
| $G_1$ | 1 | 149.300 | 3.500 | 1.60342 | 38.1 |
|       | 2 | −127.711 | 1.000 | | |
| $G_2$ | 3 | 277.893 | 1.800 | 1.84042 | 43.3 |
|       | 4 | 30.046 | 8.000 | 1.60342 | 38.1 |
|       | 5 | −41.193 | 1.800 | 1.84042 | 43.3 |
|       | 6 | 191.911 | 6.000 | | |
|       | 7 | −78.442 | 2.000 | 1.80411 | 46.1 |
| $G_3$ | 8 | 356.985 | 0.200 | | |
|       | 9 | 77.355 | 4.000 | 1.54814 | 45.9 |
|       | 10 | −269.887 | | | |

| F = 480.0 | | M = −0.063 |
|---|---|---|
| $D_0$ | ∞ | 6653.544 |
| $D_1$ | 19.400 | 44.400 |
| $B_f$ | 64.698 | 39.698 |
| $d_0 = -60.00$ | | $\Delta B_f = 25.0$ |
| $f_1 = 114.61$ | | $P_z = -0.00093$ |
| $f_{12} = -178.435$ | | |
| $f_3 = -306.972$ | | |

5. A rear-focus conversion lens device according to claim 2, wherein the following numerical data are satisfied:

| | | Magnification: $\beta = 1.6$ Focal distance $f_R = -104.384$ | | | |
|---|---|---|---|---|---|
| | No. | Radius of curvature r | Central thickness and space d of lens | Refractive Abbe index n | number $\nu$ |
| $G_1$ | 1 | 254.983 | 3.500 | 1.59507 | 35.5 |
|       | 2 | −117.209 | 0.200 | | |
| $G_2$ | 3 | 834.330 | 1.800 | 1.79668 | 45.5 |
|       | 4 | 26.007 | 5.000 | 1.59507 | 35.5 |
|       | 5 | 49.576 | 1.000 | | |
|       | 6 | 51.090 | 4.000 | 1.59507 | 35.5 |
|       | 7 | 221.927 | 6.000 | | |
| $G_3$ | 8 | −54.790 | 2.000 | 1.84042 | 43.3 |
|       | 9 | 468.187 | 0.200 | | |
|       | 10 | 61.012 | 5.000 | 1.51118 | 50.9 |
|       | 11 | −434.122 | | | |

| F = 480.00 | | M = −0.042 |
|---|---|---|
| $D_0$ | ∞ | 10468.529 |
| $D_1$ | 26.1 | 41.291 |
| $B_f$ | 55.867 | 40.675 |
| $d_0 = -53.300$ | | $\Delta B_f = 15.191$ |
| $f_1 = 135.414$ | | $P_z = -0.00242$ |
| $f_{12} = -457.613$ | | |
| $f_3 = -135.458$ | | |

6. A rear-focus conversion lens device according to claim 2, wherein the following numerical data are satisfied:

| | | Magnification: $\beta = 1.4$ Focal distance $f_R = -179.805$ | | | |
|---|---|---|---|---|---|
| | No. | Radius of curvature r | Central thickness and space d of lens | Refractive index n | Abbe number $\nu$ |
| $G_1$ | 1 | 171.000 | 4.000 | 1.59507 | 35.5 |
|       | 2 | −116.775 | 1.000 | | |
| $G_2$ | 3 | −237.148 | 1.800 | 1.84042 | 43.3 |
|       | 4 | 40.330 | 0.800 | | |
|       | 5 | 46.330 | 4.500 | 1.59507 | 35.5 |
|       | 6 | 1187.691 | 11.500 | | |
|       | 7 | −61.989 | 1.800 | 1.84042 | 43.3 |
|       | 8 | 468.108 | 0.200 | | |

-continued

| | Magnification: $\beta = 1.4$ | | Focal distance $f_R = -179.805$ | |
|---|---|---|---|---|
| $G_3$ | 9 | 68.202 | 6.300 | 1.53172 49.1 |
| | 10 | −115.778 | | |

| F = 420.0 | | M = −0.033 | |
|---|---|---|---|
| $D_0$ | ∞ | | 11833.485 |
| $D_1$ | 19.400 | | 36.301 |
| $B_f$ | 54.965 | | 38.063 |
| $d_0 = -60.000$ | | $\Delta B_f = 16.901$ | |
| $f_1 = 117.215$ | | $P_z = -0.00025$ | |
| $f_{12} = -341.438$ | | | |
| $f_3 = -378.105$ | | | |

7. A rear-focus conversion lens device according to claim 2, wherein the following relations are satisfied:

$$|f_3/f_{12}| < 3.0 \quad \ldots (7)$$

$$|f_R/f_3| < 1.0 \quad \ldots (8)$$

$$0.3 < |d_o/f_R| < 0.7 \quad \ldots (9)$$

$$|P_z f_R| < 0.35 \quad \ldots (10)$$

where $f_{12}$ is a synthetic focal length of said first and second units, $f_3$ is a focal length of said third unit, and $P_z$ is a Petzval's sum of said lens system.

8. A rear-focus conversion lens device according to claim 7, wherein the following relation is satisfied:

$$0.82 < d_o/MB < 2.8 \quad \ldots (11)$$

9. A rear-focus conversion lens device according to claim 7, wherein the following relation is satisfied:

$$0.6 < |f_1/f_r| < 1.45 \quad \ldots (12)$$

where $f_1$ is a focal length of said first unit.

10. A rear-focus conversion lens device according to claim 1, wherein said lens system having a negative refractive power comprises, in the order from the side of the object, a first unit having a negative meniscus lens having a convex surface facing toward the object and a positive lens which are cemented to each other or separated from each other, a second unit having a negative synthetic refracting power and consisting of at least two lenses which are cemented to each other or separated from each other, and a third unit having a positive refracting power and consisting of a positive meniscus lens having a convex surface facing toward the object; and the following relations are satisfied:

$$0.9 < |f_1/f_R| < 1.45 \quad \ldots (13)$$

$$0.3 < |f_2/f_R| < 0.5 \quad \ldots (14)$$

$$1.0 < |f_3/f_R| < 3.0 \quad \ldots (15)$$

$$0.4 < |f_{23}/f_R| < 0.6 \quad \ldots (16)$$

$$0.3 < |f_{23}/f_1| < 0.55 \quad \ldots (17)$$

wherein $f_1$, $f_2$ and $f_3$ are respectively focal lengths of said first, second and third units, and $f_{23}$ is a synthetic focal length of said second and third units.

11. A rear-focus conversion lens device according to claim 10, wherein the following relation is further satisfied:

$$0.41 < \Sigma d/MB < 0.7.$$

12. A rear-focus conversion lens device according to claim 10, wherein the following numerical data are satisfied:

| | Magnification: $\beta = 1.6$ | | Focal distance $f_R = -122.628$ | | |
|---|---|---|---|---|---|
| | No. | Radius of curvature r | Central thickness and space d of lens | Refractive index n | Abbe number $\nu$ |
| $G_1$ | 1 | 98.000 | 2.000 | 1.84042 | 43.3 |
| | 2 | 41.023 | 1.200 | | |
| | 3 | 54.702 | 6.000 | 1.59507 | 35.5 |
| | 4 | −69.796 | 2.000 | | |
| $G_2$ | 5 | −76.370 | 1.500 | 1.84042 | 43.3 |
| | 6 | 86.931 | 5.000 | 1.59507 | 35.3 |
| | 7 | −80.858 | 2.000 | | |
| | 8 | −76.139 | 1.500 | 1.84042 | 43.3 |
| | 9 | 189.300 | 0.200 | | |
| $G_3$ | 10 | 47.540 | 4.100 | 1.51835 | 60.3 |
| | 11 | 103.582 | | | |

| F = 480.0 | | M = −0.073 | |
|---|---|---|---|
| $D_0$ | ∞ | | 5647.126 |
| $D_1$ | 19.400 | | 49.400 |
| $B_f$ | 70.025 | | 40.025 |
| $d_0 = -60.00$ | | $\Delta B_f = 30.0$ | |
| $f_1 = 128.177$ | | $P_z = -0.00116$ | |
| $f_2 = -44.151$ | | | |
| $f_3 = 165.383$ | | | |

13. A rear-focus conversion lens device according to claim 10, wherein the following numerical data are satisfied:

| | Magnification: $\beta = 1.6$ | | Focal distance $f_R = -111.226$ | | |
|---|---|---|---|---|---|
| | No. | Radius of curvature r | Central thickness and space d of lens | Refractive index n | Abbe number $\nu$ |
| $G_1$ | 1 | 99.500 | 1.500 | 1.84042 | 43.3 |
| | 2 | 29.984 | 7.500 | 1.60342 | 38.1 |
| | 3 | −83.235 | 2.000 | | |
| $G_2$ | 4 | −90.413 | 1.500 | 1.84042 | 43.3 |
| | 5 | −65.000 | 6.000 | 1.60342 | 38.1 |
| | 6 | −70.019 | 2.000 | | |
| | 7 | −71.646 | 1.500 | 1.84042 | 43.3 |
| | 8 | 187.066 | 0.200 | | |
| $G_3$ | 9 | 43.600 | 3.500 | 1.54814 | 45.9 |
| | 10 | 59.309 | | | |

| F = 480.0 | | M = −0.063 | |
|---|---|---|---|
| $D_0$ | ∞ | | 6678.992 |
| $D_1$ | 19.400 | | 44.400 |
| $B_f$ | 67.300 | | 42.300 |
| $d_0 = -60.00$ | | $\Delta B_f = 25.0$ | |
| $f_1 = 128.599$ | | $P_z = -0.00114$ | |
| $f_2 = -47.201$ | | | |
| $f_3 = 278.352$ | | | |

14. A rear-focus conversion lens device according to claim 10, wherein the following numerical data are satisfied:

| | Magnification: $\beta = 1.6$ | | Focal distance $f_R = -116.029$ | | |
|---|---|---|---|---|---|
| | No. | Radius of curvature r | Central thickness and space d of lens | Refractive index n | Abbe number $\nu$ |
| $G_1$ | 1 | 131.700 | 1.500 | 1.84042 | 43.3 |
| | 2 | 31.554 | 7.500 | 1.60342 | 38.1 |
| | 3 | −82.901 | 4.300 | | |
| $G_2$ | 4 | −90.089 | 1.500 | 1.84042 | 43.3 |
| | 5 | −70.000 | 1.500 | 1.59507 | 38.1 |
| | 6 | −70.000 | 1.500 | 1.84042 | 43.3 |
| | 7 | 414.230 | 0.300 | | |

-continued

| | | Magnification: $\beta = 1.6$ | Focal distance $f_R = -116.029$ |
|---|---|---|---|
| $G_3$ | 8 | 43.700 | 3.500 |
| | 9 | 61.331 | |

| F = 480.0 | M = −0.065 |
|---|---|
| $D_0$ ∞ | 6422.542 |
| $D_1$ 19.400 | 45.400 |
| $B_f$ 68.640 | 42.640 |
| $d_0 = -60.00$ | $\Delta B_f = 26.0$ |
| $f_1 = 161.613$ | $P_z = -0.00094$ |
| $f_2 = -53.514$ | |
| $f_3 = 292.786$ | |

15. A rear-focus conversion lens device according to claim 1, wherein said lens system of negative refractive power has a front lens unit and a rear lens unit at the side of the object, and said rear lens unit comprises, in the order from the side of the object, a positive lens having a surface of larger curvature facing the side of the image and a negative lens having a surface of larger curvature facing the side of the object.

16. A rear-focus conversion lens device according to claim 15, wherein the following relations are satisfied:

$$0.65 < Qn < 3.5 \qquad \ldots (18)$$

$$-3.5 < Qp < -0.8 \qquad \ldots (19)$$

for $Q = (R2+R1)/(R2-R1)$ (where R1 and R2 are respectively radii of curvature of lens surfaces facing the sides of the object and image, respectively) where Qp is a shape factor of the positive lens of said rear lens unit, and Qn is a shape factor of the negative lens of said rear lens unit.

17. A rear-focus conversion lens device according to claim 16, wherein the following numerical data are satisfied:

| | | Magnification: $\beta = 1.6$ | Focal distance $f_R = -101.191$ | | |
|---|---|---|---|---|---|
| | No. | Radius of curvature r | Central thickness and space d of lens | Refractive index n | Abbe number $\nu$ |
| $G_1$ | 1 | 140.057 | 2.80 | 1.53172 | 49.1 |
| | 2 | −99.520 | 2.00 | | |
| | 3 | −171.493 | 1.50 | 1.84042 | 43.3 |
| | 4 | 35.217 | 0.20 | | |
| | 5 | 31.799 | 5.60 | 1.59507 | 35.5 |
| | 6 | −52.887 | 4.00 | | |
| $G_2$ | 7 | −31.666 | 1.50 | 1.84042 | 43.3 |
| | 8 | 43.500 | 3.80 | 1.59507 | 35.5 |
| | 8 | 43.500 | 3.80 | 1.59507 | 35.5 |
| | 9 | −280.571 | 4.00 | | |
| $G_3$ | 10 | −250.255 | 4.80 | 1.51454 | 54.6 |
| | 11 | −28.039 | 0.20 | | |
| | 12 | −52.701 | 1.80 | 1.84042 | 43.3 |
| | 13 | −132.306 | | | |

| F = 480.0 | M = −0.023 |
|---|---|
| $D_0$ ∞ | 19611.058 |
| $D_1$ 30.450 | 38.266 |
| $B_f$ 46.050 | 38.233 |
| $d_0 = -48.95$ | $\Delta B_f = 7.817$ |
| $f_{12} = -56.563$ | $P_z = -0.00034$ |
| $f_3 = 147.364$ | $Q_p = -1.252$ |
| | $Q_n = 2.324$ |

18. A rear-focus conversion lens device according to claim 16, wherein the following numerical data are satisfied:

| | | Magnification: $\beta = 1.6$ | Focal distance $f_R = -96.124$ | | |
|---|---|---|---|---|---|
| | No. | Radius of curvature r | Central thickness and space d of lens | Refractive index n | Abbe number $\nu$ |
| $G_1$ | 1 | 102.300 | 3.10 | 1.51118 | 50.9 |
| | 2 | −105.405 | 2.00 | | |
| | 3 | −212.856 | 1.30 | 1.84042 | 43.3 |
| | 4 | 33.501 | 5.30 | 1.59507 | 35.5 |
| | 5 | −52.401 | 4.00 | | |
| $G_2$ | 6 | −30.249 | 1.30 | 1.84042 | 43.3 |
| | 7 | 59.519 | 2.80 | 1.59507 | 35.5 |
| | 8 | −428.394 | 4.00 | | |
| | 9 | −6054.000 | 4.80 | 1.54814 | 45.9 |
| $G_3$ | 10 | −28.207 | 0.20 | | |
| | 11 | −60.000 | 1.80 | 1.84042 | 43.3 |
| | 12 | −440.553 | | | |

| F = 480.0 | M = −0.023 |
|---|---|
| $D_0$ ∞ | 19612.482 |
| $D_1$ 30.450 | 38.281 |
| $B_f$ 46.255 | 38.395 |
| $d_0 = -48.95$ | $\Delta B_f = 7.830$ |
| $f_{12} = -83.436$ | $P_z = -0.00071$ |
| $f_3 = 135.681$ | $Q_p = -1.315$ |

19. A rear-focus conversion lens device according to claim 16, wherein the following numerical data are satisfied:

| | | Magnification: $\beta = 1.6$ | Focal distance $f_R = -77.575$ | | |
|---|---|---|---|---|---|
| | No. | Radius of curvature r | Central thickness and space d of lens | Refractive index n | Abbe number $\nu$ |
| $G_1$ | 1 | 71.700 | 1.30 | 1.84042 | 43.3 |
| | 2 | 38.824 | 0.50 | | |
| | 3 | 35.462 | 5.00 | 1.57501 | 41.5 |
| | 4 | −67.154 | 1.50 | | |
| $G_2$ | 5 | −56.993 | 1.50 | 1.84042 | 43.3 |
| | 6 | 40.000 | 5.00 | 1.60342 | 38.1 |
| | 7 | −51.885 | 3.00 | | |
| $G_3$ | 8 | −80.122 | 1.50 | 1.84042 | 43.3 |
| | 9 | 50.000 | 5.00 | 1.60342 | 38.1 |
| | 10 | −38.302 | 0.20 | | |
| | 11 | −31.521 | 1.80 | 1.84042 | 43.3 |
| | 12 | −1323.872 | | | |

| F = 480.0 | M = −0.023 |
|---|---|
| $D_0$ ∞ | 19615.700 |
| $D_1$ 30.450 | 38.355 |
| $B_f$ 47.307 | 39.403 |
| $d_0 = -48.95$ | $\Delta B_f = 7.904$ |
| $f_{12} = 158.163$ | $P_z = -0.00112$ |
| $f_3 = -49.018$ | $Q_p = -2.832$ |
| | $Q_n = 1.062$ |

20. A rear-focus conversion lens device according to claim 16, wherein the following numerical data are satisfied:

| | | Magnification: $\beta = 1.6$ | Focal distance $f_R = -79.834$ | | |
|---|---|---|---|---|---|
| | No. | Radius of curvature r | Central thickness and space d of lens | Refractive index n | Abbe number $\nu$ |
| $G_1$ | 1 | 61.260 | 1.30 | 1.84042 | 43.3 |
| | 2 | 35.462 | 5.00 | 1.54814 | |
| | 3 | −66.991 | 3.00 | | |
| $G_2$ | 4 | −48.242 | 1.50 | 1.84042 | 43.3 |
| | 5 | 50.000 | 4.50 | 1.59507 | 35.5 |
| | 6 | −53.920 | 2.00 | | |
| $G_3$ | 7 | −75.319 | 1.50 | 1.84042 | 43.3 |
| | 8 | 50.000 | 5.50 | 1.61293 | 37.0 |
| | 9 | −34.509 | 0.20 | | |
| | 10 | −46.749 | 1.80 | 1.84042 | 43.3 |

-continued

Magnification: $\beta = 1.6$  Focal distance $f_R = -79.834$

| 11 | 1310.623 | | |
|---|---|---|---|
| | | F = 480.0 | M = −0.023 |
| $D_0$ | ∞ | | 19615.466 |

-continued

Magnification: $\beta = 1.6$  Focal distance $f_R = -79.834$

| $D_1$ | 30.450 | 38.344 |
|---|---|---|
| $B_f$ | 47.542 | 39.648 |
| $d_0 = -48.95$ | | $\Delta B_f = 7.894$ |
| $f_{12} = 309.386$ | | $P_z = -0.00107$ |
| $f_3 = -60.030$ | | $Q_p = -2.691$ |
| | | $Q_n = 0.931$ |

* * * * *